(12) United States Patent
Hsiung et al.

(10) Patent No.: US 8,567,997 B2
(45) Date of Patent: Oct. 29, 2013

(54) SINGLE PIECE LIGHT GUIDE HAVING LIGHT ROD AND LENS

(75) Inventors: Chien-chih Hsiung, Zhubei (TW); Yu-Hsiang Huang, Taoyuan (TW); Wen-Lang Hung, Fuxing Township (TW); Hung Kuang Yang, Toufen Township (TW)

(73) Assignee: Asia Optical International Ltd., Tortola (VG)

( * ) Notice: Subject to any disclaimer, the term of this patent is extended or adjusted under 35 U.S.C. 154(b) by 0 days.

(21) Appl. No.: 13/226,255

(22) Filed: Sep. 6, 2011

(65) Prior Publication Data

US 2013/0058122 A1    Mar. 7, 2013

(51) Int. Cl.
F21V 5/00    (2006.01)

(52) U.S. Cl.
USPC .............. 362/326; 362/23.09; 362/23.16; 362/311.01; 362/608; 362/615; 385/34

(58) Field of Classification Search
USPC .......... 362/227, 311.01, 326, 600, 608, 613, 362/615, 617, 621, 632, 26, 27, 311.06, 362/311.15, 328, 558, 582; 353/30, 34, 94, 353/102; 385/34

See application file for complete search history.

(56) References Cited

U.S. PATENT DOCUMENTS

| | | | |
|---|---|---|---|
| 6,674,030 | B2 | 1/2004 | Chen et al. |
| 7,083,315 | B2 | 8/2006 | Hansler et al. |
| 7,185,985 | B2 | 3/2007 | Hanano |
| 7,540,616 | B2 | 6/2009 | Conner |
| 7,841,746 | B2 | 11/2010 | Kamijima |
| 7,980,733 | B2 | 7/2011 | Shih et al. |
| 2006/0098170 | A1 | 5/2006 | Lin |
| 2010/0109564 | A1 | 5/2010 | Shin et al. |
| 2011/0019432 | A1 | 1/2011 | Epmeier |
| 2011/0058350 | A1 | 3/2011 | Phillips, III et al. |

FOREIGN PATENT DOCUMENTS

WO    2005060268 A1    6/2005

OTHER PUBLICATIONS

"Light Guide Techniques Using LED Lamps," Application Brief I-003, Agilent Technologies, Dec. 7, 2001, Retrieved from the Internet: <URL:http://www.ciri.org.nz/downloads/Lightpipe%20design.pdf>, 22 pages.

Obuchi, et al., "High Performance Optical Materials Cyclo Olefin Polymer ZEONEX," SPIE Paper No. 6671-58, 2007, Zeon Corporation, Kawasaki, Japan, 9 pages.

Response to Office Action dated Jan. 22, 2013, U.S. Appl. No. 13/226,272, filed Sep. 6, 2011, 10 pages.

Office Action dated Nov. 9, 2012, U.S. Appl. No. 13/226,272, filed Sep. 6, 2011, 10 pages.

U.S. Appl. No. 13/226,272, filed Sep. 6, 2011.
U.S. Appl. No. 13/226,291, filed Sep. 6, 2011.
Notice of Allowance and Fee(s) Due dated Apr. 10, 2013, U.S. Appl. No. 13/226,272, filed Sep. 6, 2011, 17 pages.

*Primary Examiner* — Stephen F Husar
*Assistant Examiner* — Meghan Dunwiddie
(74) *Attorney, Agent, or Firm* — Vierra Magen Marcus LLP

(57) ABSTRACT

A single piece light guide is disclosed herein. The single piece light guide may include a light rod and a lens. The single piece light guide may be formed using injection molding. The light guide may have one or more regions between the light rod and the lens. A housing may be provided for the light guide. The housing may have an opening that physically supports the light rod. Therefore, the light rod may be secured into place, which may prevent misalignment during use. The one or more regions between the light rod and the lens may assist in assembling and holding the light guide in the housing.

19 Claims, 17 Drawing Sheets

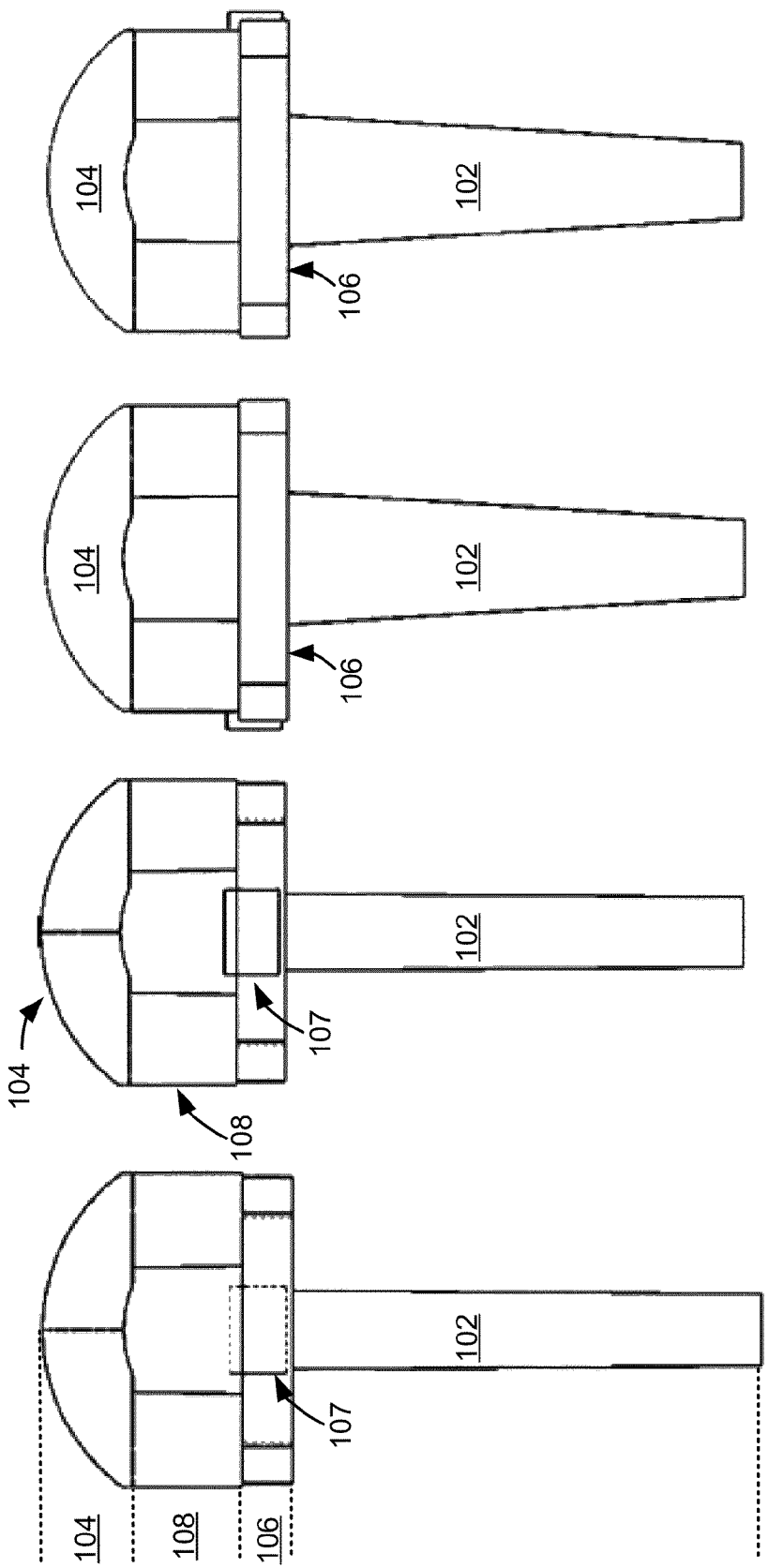

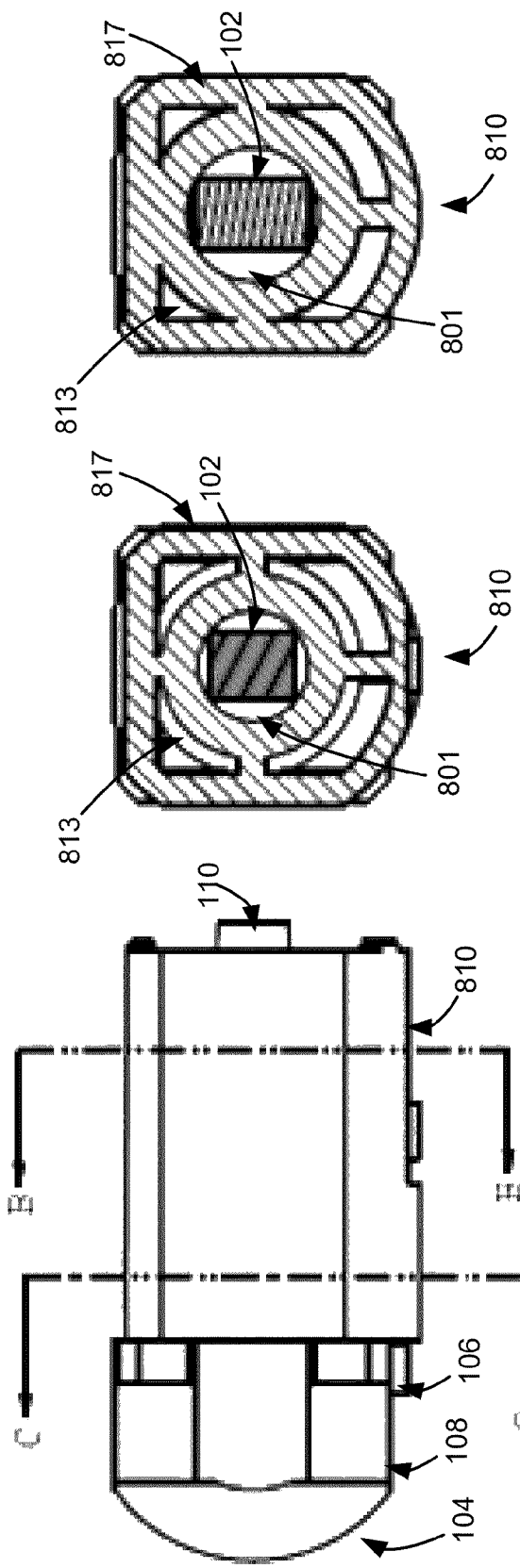

1200

| Form single piece light guide having a light rod and a lens | — 1202 |

# SINGLE PIECE LIGHT GUIDE HAVING LIGHT ROD AND LENS

BACKGROUND

Light pipes and guides have a variety of applications. A light guide receives light from a light source and transports it some distance with minimal loss. For example, light from one or more LEDs can be transmitted to another location. The light guide may also process the light in some manner. For example, the light guide may integrate light of different colors. The light guide may also collimate the light. One possible application for a light guides is in a light projector.

As with other areas of technology, there are benefits to making light projectors and other devices that use light guides smaller. One potential application for light projectors may be cellular telephones. Therefore, there may be a need for smaller components for light projectors, as well as other optical devices that use light guides. However, there are challenges in economically making light guides that are small, reliable, and of high quality.

Moreover, there are challenges in assembling a device that uses a light guide. Considerable time and effort can be taken to properly align the light guide to the light source and other optical elements, such that light may be transmitted efficiently. Moreover, assembly may become more challenging as devices scale down in size.

Furthermore, during use, devices that use light guides may be subject to being dropped or suffer from other jarring events. Such events may cause misalignment of the light guide.

BRIEF DESCRIPTION OF THE DRAWINGS

FIG. 3A, FIG. 3B, FIG. 3C, and FIG. 3D depict side plan views of one embodiment of the light guide of FIG. 1.

FIG. 9A depicts a side plan view of one embodiment of an interior piece of a housing.

FIG. 9B depicts a cross section of one embodiment at line B-B of FIG. 9A.

FIG. 9C depicts a cross section of one embodiment at line C-C of FIG. 9A.

DETAILED DESCRIPTION

Disclosed herein are light guides, light engines that use light guides, methods for making light guides, and methods for assembling light source housing assemblies.

A single piece light guide and methods for making a single piece light guide are included in embodiments disclosed herein. The single piece light guide of one embodiment includes a light rod and a lens. In one embodiment, the light rod integrates light of different colors. In one embodiment, the lens is a collimating lens. In one embodiment, the single piece light guide is formed using injection molding. The single piece light guide can be manufactured inexpensively. Moreover, there is no need to align the lens with the light rod. Note that some conventional light guides may require that a lens is physically aligned to a light rod or light guide, which can be quite time consuming and prone to misalignment. Moreover, the lens of embodiments of a single piece light guide can be assured to be properly aligned to the light rod.

One embodiment includes a housing that surrounds a light rod. Together, the housing and light guide (with perhaps other complements) may be referred to as a light source housing assembly. The housing may provide physical support for the light rod. For example, the housing may have a conical opening that physically supports a tapered light rod. Therefore, the light rod may be secured into place, which may prevent misalignment during use. The housing may facilitate proper alignment of the light guide to a light source, as well as other optical elements. Also, the housing may facilitate assembly of the light guide into a device (such as a light engine). Therefore, one embodiment of a light source housing assembly can be quickly, accurately, and economically assembled.

One embodiment includes a light guide that has one or more regions between a light rod and lens. These regions may be used to help align and/or secure the light guide into a housing. It is possible that an outer surface of the region(s) has physical contact with the housing. Note that for some conventional devices that transmit light using internal reflection, light may escape rather than be internally reflected if an element physically contacts the outside of a device. However, the outer surfaces of embodiments of the region between the light rod and lens may be located such that physical contact with a housing does not cause light loss. For example, the outer surfaces of the regions may be located away from an optical path, such that little or no light needs to be internally reflected when passing through the regions.

Figure 1:
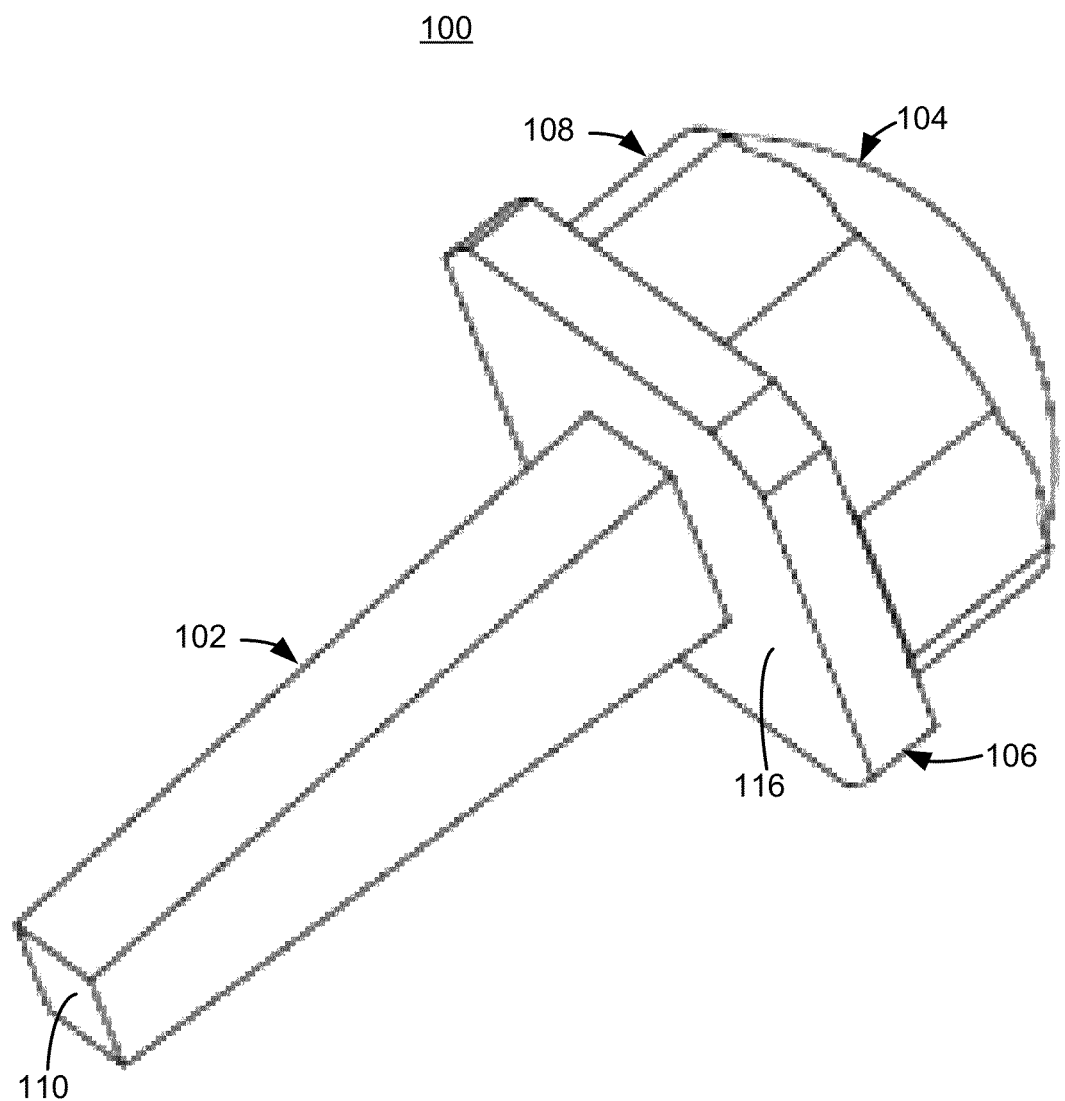
FIG. 1 depicts a perspective view of one embodiment of a light guide.
Figure 2:
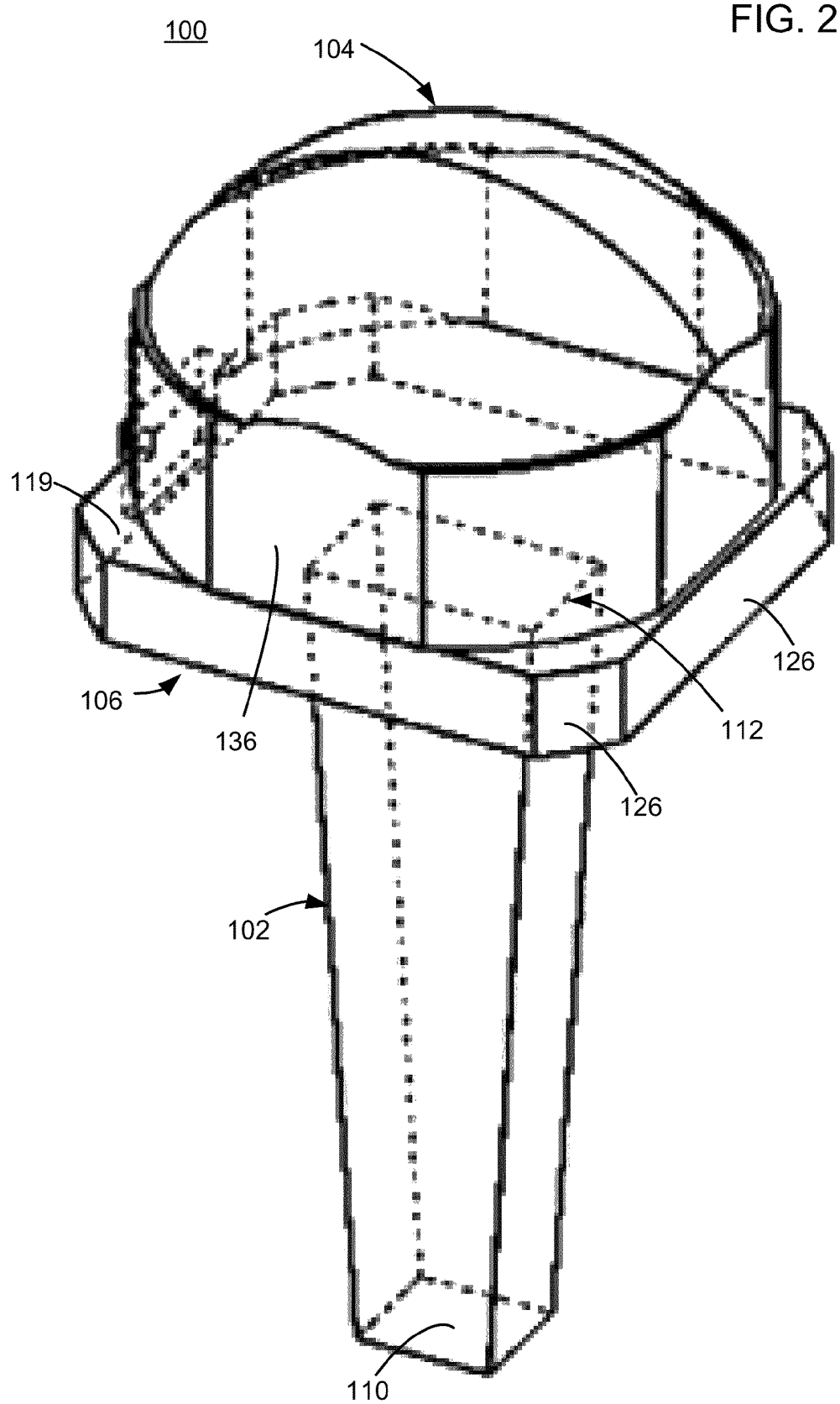
FIG. 2 is a perspective view of one embodiment of the light guide of FIG. 1.
Figure 4A:
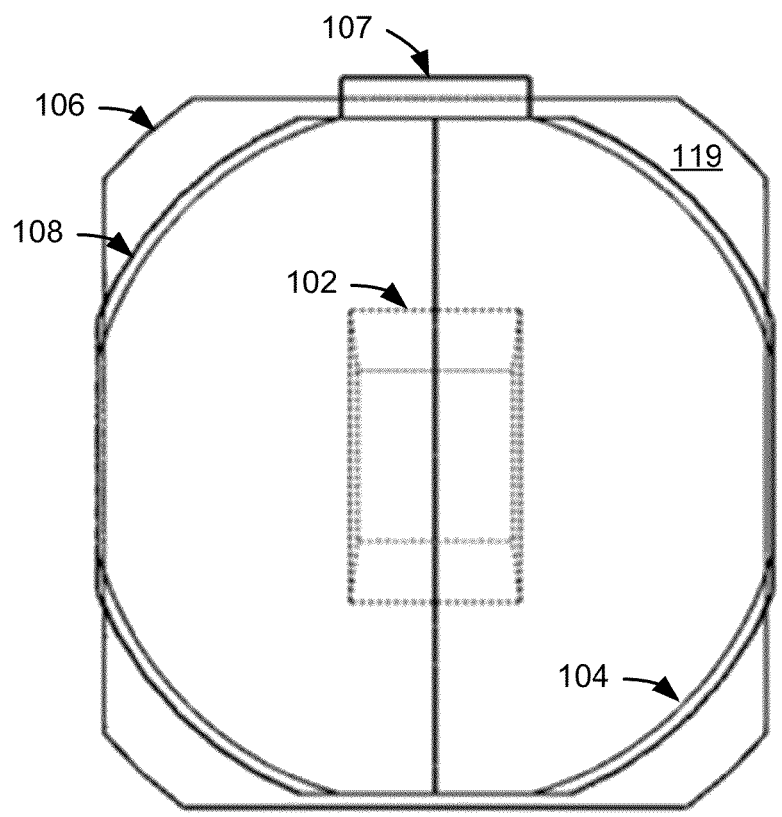
FIG. 4A depicts a top plan view of one embodiment of the light guide of FIG. 1.
Figure 4B:
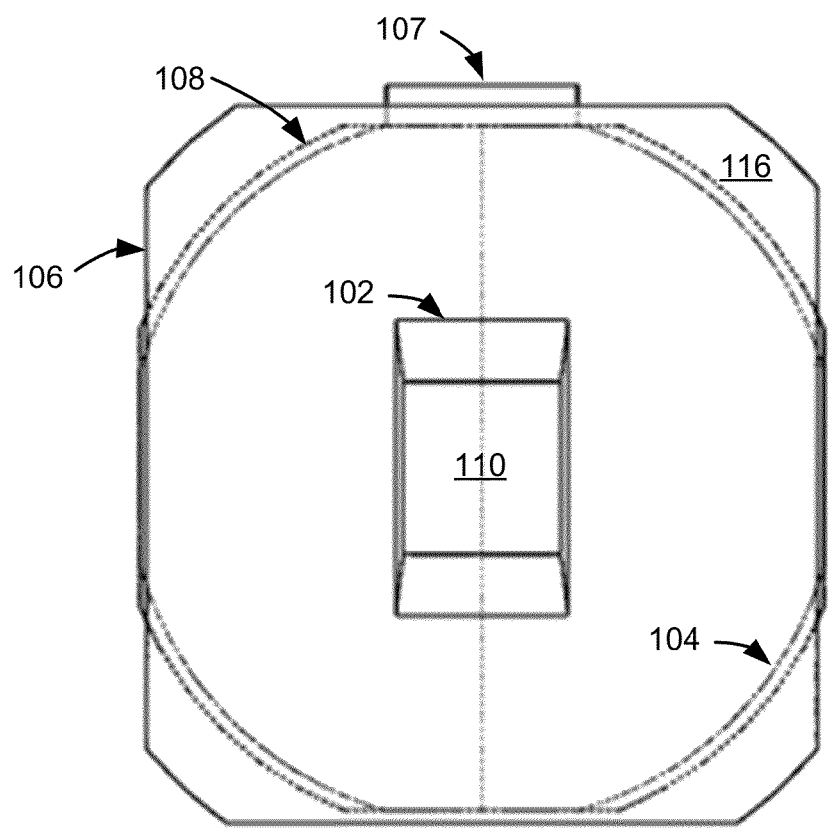
FIG. 4B depicts a bottom plan view of one embodiment of the light guide of FIG. 1.

FIG. 1, FIG. 2, FIGS. 3A-3D, and FIGS. 4A-4B depict one embodiment of a light guide 100. FIGS. 1 and 2 depict perspective views. FIGS. 3A-3D depict side plan views. FIG. 4A depicts a top plan view. FIG. 4B depicts a bottom plan view. The following discussion may refer to one or more of FIGS. 1-4B.

Light guide 100 may include a light rod 102 and a lens 104. Light guide 100 of one embodiment also includes regions 106 and 108 between light rod 102 and lens 104. FIG. 3A depicts dashed lines to depict the extent of the regions 106, 108 for one embodiment. Note that since regions 106 and 108 are physically interposed between light right 102 and lens 104 in some embodiments, that light may travel through at least a portion of regions 106 and 108. Regions 106 and 108 will be discussed more fully below.

In one embodiment, light rod 102 has a light entrance 110 at a first end that receives or captures light. The light may be captured from a light source, such as one or more LEDs (not depicted in FIGS. 1-4B). As one alternative, laser light might be used. Light entrance 110 is depicted as having a flat surface in FIGS. 1-4B. However, a flat surface is not required. Light entrance 110 has a curved surface in one embodiment. A curved surface may improve the efficiency of capturing light from a light source, depending on the shape of the light source. In some embodiments, a curved surface is used when the light source is a single LED. The surface of light entrance 110 may have a coating to improve efficiency of light capture. However, the coating is not required.

Light rod 102 has a second end that serves as a light exit 112 (see, for example, FIG. 2). Thus, light rod 102 is able to capture and transmit light. By light exit it is meant that light exits light rod 102. Note that light exit 112 may be joined to another part of light guide 100, such as region 106. Therefore, light does not necessarily leave light guide 100 at light exit 112. Note that light exit 112 may be at the border between light rod 102 and region 106. FIG. 1 shows how the second end of light rod 102 meets the lower surface 116 of region 106.

Light exit 112 may have a rectangular shape. However, light exit 112 could have a shape other than rectangular. In some embodiments, the shape of light exit 112 is similar to that of a target region to illuminate. For example, if light guide 100 is being used in a light engine of a projector with a desired display having a 16:9 aspect ratio, then light exit 112 could have this aspect ratio. However, note that this is not a requirement, as other elements can be used to shape light after it leaves light guide 100.

Light rod 102 may taper from light exit 112 towards light entrance 110. For example, light rod 102 may get progressively more narrow towards light entrance 110. Light rod 102 has four sides and four edges between light exit 112 and light entrance 110, in one embodiment. However, light rod 102 could have more or fewer than four sides. Likewise, light rod 102 could have more or fewer than four edges. Also, light rod 102 is not required to be tapered.

In some embodiments, the sides of light rod 102 that are essentially parallel to the direction of light travel (or optical axis) are smooth. Having smooth sides may improve efficiency of light transfer. The outside surface of light rod 102 may optionally be painted, or have some other type of coating, to improve efficiency of light transfer. The color and/or type of coating may be selected to help prevent light from escaping from the side walls of light rod 102.

In some embodiments, light is transmitted through light rod 102 by total internal reflection. In one embodiment, the light reflects about twice in its travel through light rod 102. For example, for a light rod 102 that is between 7-8 mm in length, light may reflect twice, given other parameters, such as the taper and range of light frequencies. However, light rod 102 may be shorter than 7 mm or longer than 8mm.

In one embodiment, light rod 102 is able to mix or integrate light of different colors. For example, light entrance 110 may capture light from one or more red, blue, and green LEDs. The light rod 102 may uniformly disperse light emitted from the LEDs. However, the light source could be a single color of light. Therefore, light exit 112 may output light of a single color (red light, for example). Thus, it is not required that light rod 102 be used to uniformly disperse light of different colors.

Herein, embodiments of light rod 102 may be referred to as an "integrating optic." It will be understood that this means that light rod 102 has the ability to integrate light of different colors.

In one embodiment, light entrance 110 may have dimensions of about 1.15 mm×1.26 mm. However, light entrance 110 may have larger or smaller dimensions. In one embodiment, light exit 112 has dimensions of about 2.16×1.26 mm. Therefore, the diagonal ("d") of light exit 112 may be about 2.5 mm.

Lens 104 has a convex shape in one embodiment. However, a convex shape is not required in all embodiments. The shape of lens 104 may be less than a hemisphere in one embodiment. Lens 104 has a radius of about 3 mm, in one embodiment. However, the radius (R) could be larger or smaller. As noted, light exit 112 may have a diagonal (d) of about 2.5 mm, in one embodiment. Therefore, R/d may be about 1.2, in one embodiment. Note that R/d could be greater or smaller. Lens 104 may have a clear aperture of about 5.2 mm. The surface of lens 104 may have an anti-reflecting coating. For example, the reflection may be about 1% or less for light that is normal incident at the lens 104. Note that the anti-reflecting coating is not a requirement.

In one embodiment lens 104 of light guide 100 is a collimating lens. However, in some embodiments, the lens 104 performs a function other than collimating the light. For example, lens 104 may be a focusing lens. Thus, lens 104 is not required to collimate light, in all embodiments.

Lens 104 may be optically coupled to the light exit 112 (of light rod 102. Note that light from light exit 112 may pass through a portion of regions 106 and/or 108 before arriving at lens 104. Therefore, it will be understood that "optically coupled to" may include indirectly optically coupled through one or more regions such as 106 and/or 108.

Light guide 100 may be formed from an optical grade material. Examples of optical grade materials include, but are not limited to, acrylic resins, polycarbonates, epoxies, and glass. In some embodiments, the entire light guide 100 is formed from the same material. However, in some embodiments, light guide 100 is formed from two or more different materials. In one embodiment, light rod 102 is solid. For example, light rod 102 may be a solid integrating optic. In one embodiment, light rod 102 is hollow.

In some embodiments, light guide 100 is manufactured as a single piece. As one example, injection molding can be used to form light guide 100. Note that this means that there is no need to align lens 104 with light rod 102. Element 107 (see, FIG. 3A, 3B, 4A, 4B) results from one embodiment of the injection molding process, and is not required. The injection molding process may involve closing a mold, and then injecting material into a small opening in the mold. Element 107 may coincide with the opening in the mold. In one embodiment, element 107 is used to help position light guide 100 into a housing. As noted, the light exit 112 may be rectangular. Element 107 may be used to position the light exit 122 properly.

As the term is used herein, a single piece light guide 100 is one in which the light rod 102 and lens 104 are both part of a single, unbroken piece of material. Note that a single piece light guide 100 differs from one in which a lens is merely physically attached to the light rod 102 (attached by optical grade epoxy, for example). As already mentioned, there are benefits to a single piece light guide 100 in terms of ease/cost of assembly, as well as accuracy of alignment.

Note that in some embodiments, light guide 100 is not a single piece unit. For example, in one embodiment, lens 104 is manufactured as a separate piece from the light rod 102. Lens 104 may be physically attached to light rod 102, or to one or more regions 106, 108 between the light rod 102 and lens 104.

As noted, light guide 100 may have one or more regions (e.g., regions 106, 108) between light rod 102 and lens 104. In general, a cross section of these regions 106, 108 may be different in size and/or shape than a cross section of light rod 102 and lens 104. The cross section being referred to here is orthogonal to the optical axis.

For example, region 106 may have a cross section that has a larger area than the area of light exit 112 of light rod 102. Also, the shape of region 106 is not necessarily the same shape as light rod 102. In one embodiment, region 106 has a cross section that is substantially rectangular (which may include a square). However, corners of region 106 may be rounded or cut off.

Region 106 has a lower surface (FIG. 1, 116), one or more top surfaces (FIG. 2, 119), and one or more side surfaces (FIG. 2, 126). In the embodiment of FIG. 2 there are a total of four top surfaces 119, and eight side surfaces 126. There may be more or fewer than four top surfaces 119. There may be more or fewer than eight side surfaces. For example, there might be only four side surfaces 126. One or more of the side surfaces 126 may be substantially planar.

Region 108 may have a size and/or shape that is significantly different from light rod 102 and/or lens 104. In one embodiment, region 108 has a cross section shaped like a polygon. The cross section being referred to is perpendicular to the optical axis. For example, region 108 may have eight sides. However, region 108 could have more or fewer than eight sides.

Region 108 has outer or side surfaces (FIG. 2, 136). In the embodiment of FIG. 2 region 108 has eight side surfaces 136. There may be more or fewer than eight side surfaces to region 108. In one embodiment, four side surfaces of region 108 are aligned with four sides of region 106. However, four other side surfaces of region 108 may be recessed somewhat such that region 106 has ridges. Note that a top surface 119 may define the extent of a ridge. The ridges may help to align light guide 100 into a housing. The ridges may also help to secure light guide 100 in place.

Figure 5:
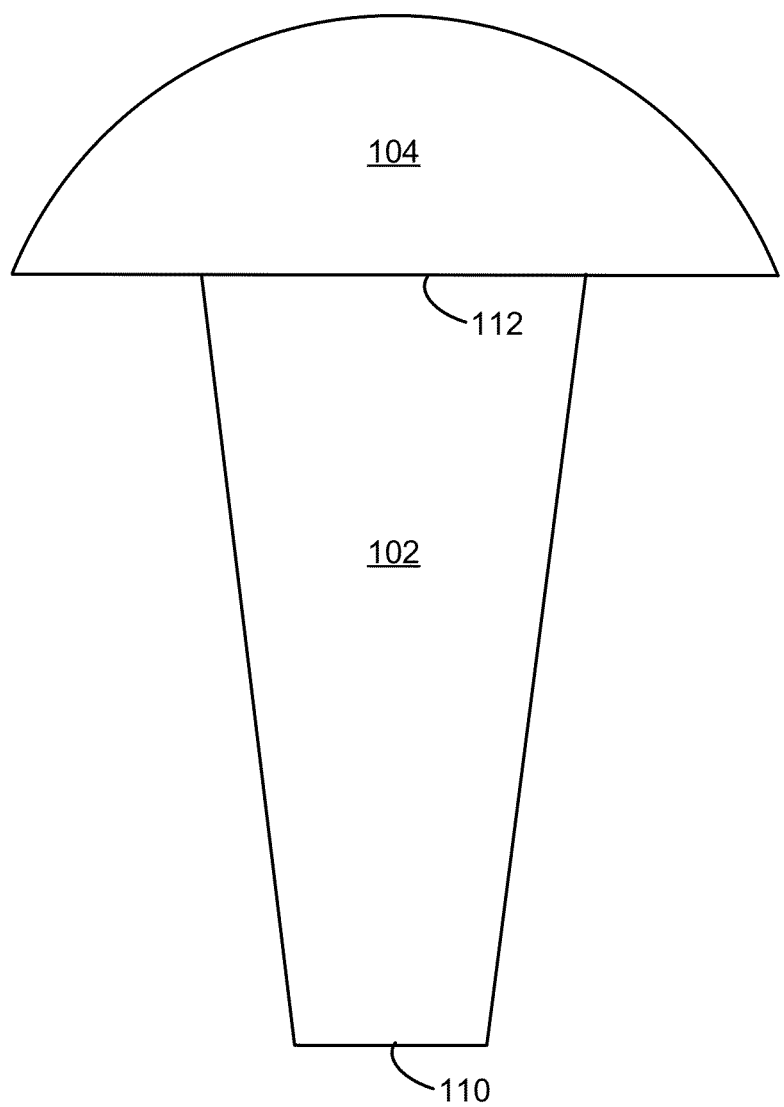
FIG. 5 depicts one embodiment of a light guide without regions between the light rod and lens.

As noted, light guide 100 is not required to have regions 106, 108 between light rod 102 and lens 104. FIG. 5 depicts one embodiment of a light guide 100 without such regions. FIG. 5 shows a plan view in which lens 104 is directly adjacent to light exit 112 of light rod 102. In one embodiment, light guide 100 is a single piece having a light rod 102 that is physically adjacent to a lens 104.

Figure 6:
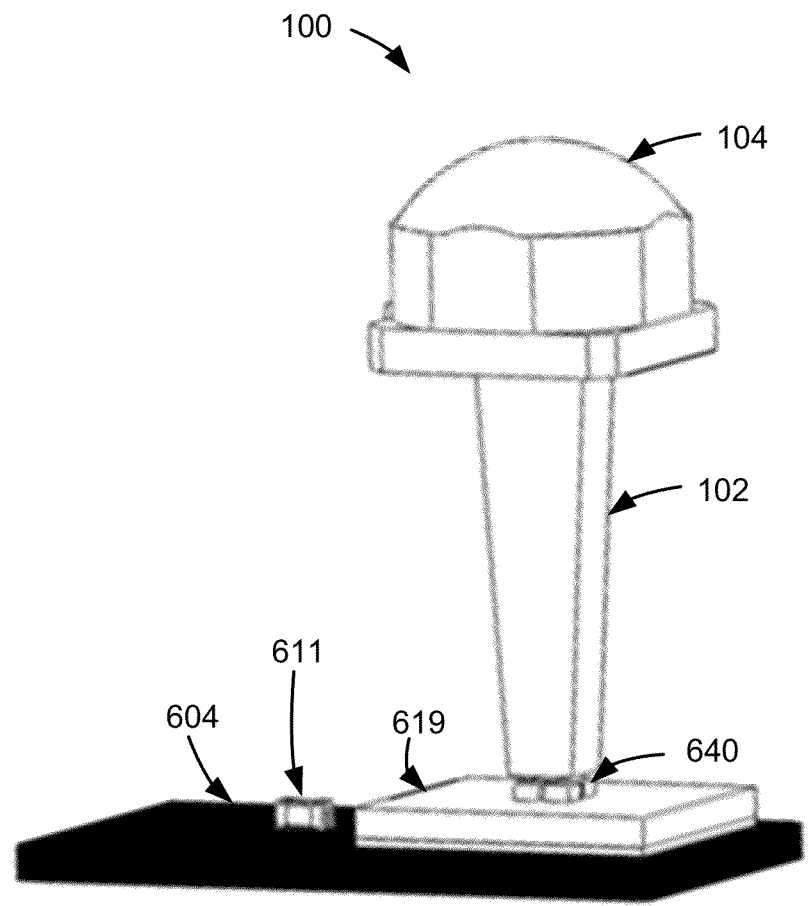
FIG. 6 depicts one embodiment of light guide optically coupled to an LED module.

FIG. 6 depicts one embodiment of light guide 100 optically coupled to a light source module 604. The light source module 604 has one or more LEDs on a PC board 619, or the like. In some embodiments, there is one red, one blue, and two green LEDs in a Bayer pattern. The light source module 604 may have a thermistor, for sensing temperature near the LEDs.

Light entrance 110 of light guide 100 is located to capture light from the light source 640. The size and shape of light entrance 110 of light guide 100 may be designed to match the size and shape of light source 640. For example, the surface of light entrance 110 could be flat. The surface of light entrance 110 could be concave, such that light source 640 can fit at least partially into the concave opening.

Light entrance 110 may be placed in close proximity to light source 640 to improve efficiency of light capture. In some embodiments, there is a gap between light source 640 and light guide 100. With an air gap there may be some air gap Fresnel loss, resulting in a loss of light capture. In one embodiment, the surface area of light entrance 110 is slightly larger than the area of light source 640, which may limit Fresnel losses across the gap. The gap may be filled with a material that is designed to improve optical properties. In one embodiment, a flux focusing lens is placed between light source 640 and light entrance 110 to improve light capture.

In some embodiments, light source 640 is physically attached to light guide 100. For example, light source 640 may be glued to light entrance 110 with optical grade epoxy. The flux capture may be essentially 100% in this case. However, note that physically attaching light source 640 to light entrance 110 is not required.

Note that light source 640 is not required to be provided by LEDs. As one alternative, light source 640 is provided by one or more lasers.

In one embodiment, pulse width modulation (PWM) is used to control intensity and/or color output by the light source 640 (e.g., LEDs. In one embodiment, each of the LEDs may be independently controlled by a PWM signal. The PWM signal may turn an LED on or off by controlling the current to the LED. In one embodiment, the PWM signal includes a train of pulses at a fixed frequency. The pulse width may be modulated to control light intensity from an LED. The PWM signals may be under control of a processor. Note that the light source 640 may be controlled by a control signal other than a PWM signal.

Figure 7A:
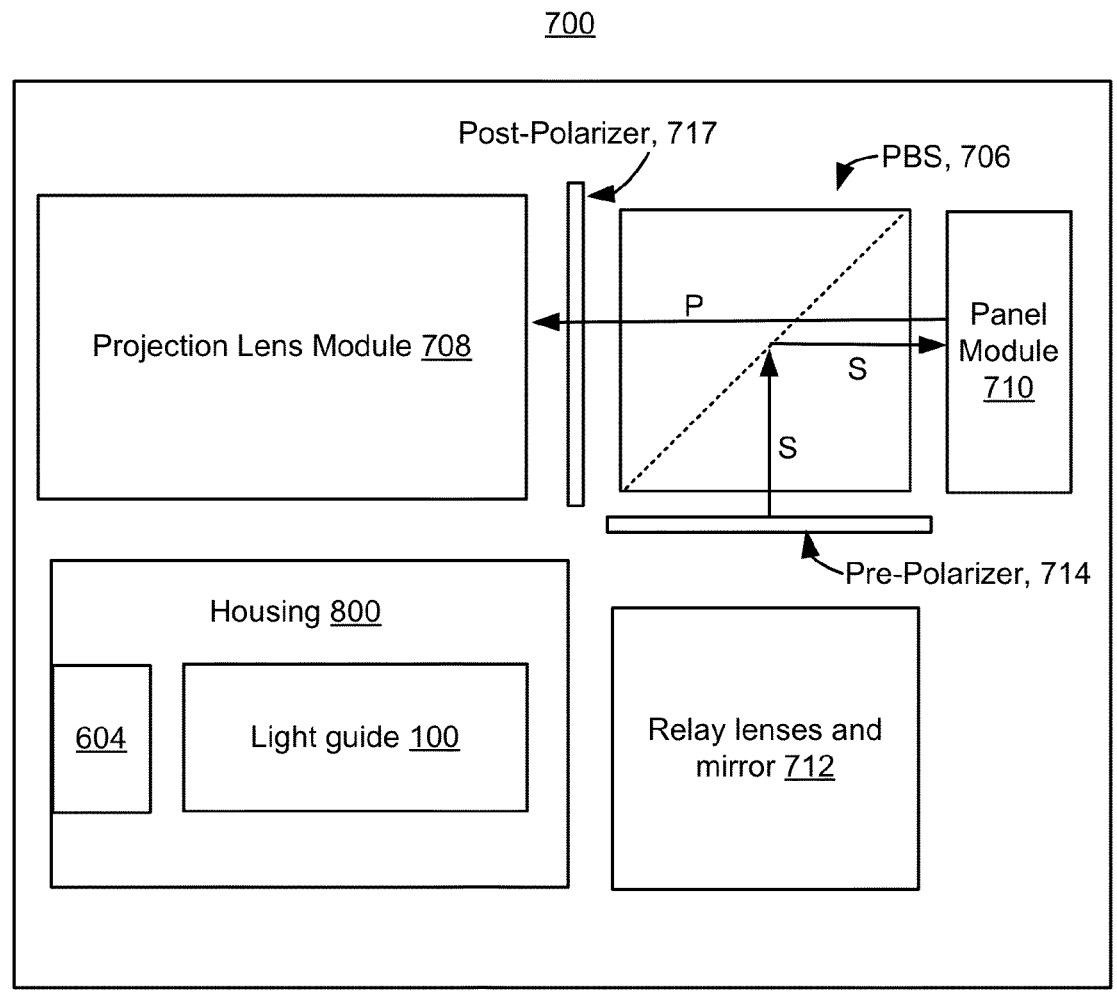
FIG. 7A depicts a block diagram of one embodiment of a light engine in which embodiments of light guide may be used.

FIG. 7A depicts a block diagram of one embodiment of a light engine 700 in which embodiments of light guide 100 may be used. Light engine 700 may be used to project a light image, including both still and moving images. Light engine 700 includes a light source module 604, light guide 100, housing 800, relay lenses and mirror 712, polarization beam splitter (PBS) 706, panel module 710, pre-polarizer 714, post polarizer 717, and projection lens module 708. Note that some elements are not depicted. For example, the light engine 700 could also have various gears for adjusting the projection lenses 708.

Light source module 604 may include one or more LEDs, in one embodiment. In some embodiments, more than one color of LED is used. For example, one or more red, green, and blue LEDs may be used. In one embodiment, the LEDs have a Bayer pattern. The LEDs may reside on a circuit board. Note that instead of an LED module, a laser module (or other light generation technology) could be used.

Any of the embodiments of light guide 100 described herein may be used for the light guide 100. Note that light guide 100 may be surrounded by housing 800, which may help to properly align light guide 100 to light source module 604. Together, housing 800, light source module 604, and light guide 100 may be referred to as a light source housing assembly.

Light guide 100 may integrate and collimate the LED light. This collimated light may be transmitted to pre-polarizer 714 via the relay lenses and mirror 712. The relay lenses and mirror 712 could include a first relay lens, a mirror, and a second relay lens.

Pre-polarizer 714 may linearly polarize the collimated light. For example, the pre-polarizer 714 may polarize the light to the S polarization state (e.g., perpendicular to the incidence plane). Pre-polarizer 714 may work with the PBS 706 to enhance contrast, as will be explained later. In some embodiments, pre-polarizer 714 polarizes the light to the same polarization state that the PBS 706 passes to the panel module 710.

The PBS 706 may include two prisms with their hypotenuse surfaces joined. One prism receives light from pre-polarizer 714. The PBS 706 is able to transmit light of one polarization state (e.g., S-state) to panel module 710. Note that PBS 706 may, alternatively, transmit light that is P-polarized to panel module 710 (if the panel module 710 were located elsewhere). For example, panel module 710 could be located above the PBS 706 in FIG. 7A. Therefore, instead of reflecting S-state light to panel module 710, the PBS 706 could allow P-state light to pass straight through both prisms to panel module 710. In this case, pre-polarizer 714 may polarize the light to the P-state.

Note that the PBS 706 may not be completely efficient at transmitting light of one polarization and blocking light of another. In other words, its polarization selectivity may not be 100 percent. In order to produce a projected image of high contrast, the PBS 706 should have a high selectivity between polarizations (e.g., between S-state and P-state). Pre-polarizer 714 may help to improve contrast by polarizing the light prior to the PBS 706, which may improve the polarization selectivity of the PBS 706.

Panel module 710 includes a liquid crystal on silicon (LCoS) module, in one embodiment. An LCoS device may include a silicon substrate that supports liquid crystals. There may be a reflective surface below the liquid crystals. Liquid crystals may have the ability to alter the polarization of light, based on their state. For example, in one state the liquid crystals may align themselves such that the light is not affected. For some devices this may be achieved by application of a voltage or current to the liquid crystals. However, in another state, the liquid crystals may alter the polarization. The state of the liquid crystal molecules may be controlled by an active matrix array of complementary metal-oxide-semiconductor (CMOS) transistors. Therefore, the liquid crystal molecules may be controlled at a pixel level. As one example, the transistors may selectively rotate axes of the liquid crystal molecules.

Thus, panel module 710 may comprise pixels capable of changing the polarization direction of light. For example, S-polarized light may be changed to P-polarized light. Alternatively, if the PBS 706 transmits P-polarized light to the panel module 710, then the panel module 710 may change the light to S-polarized light. In either case, one polarization (e.g., S-state) may be referred to as the bright state, whereas the other polarization (e.g., the P-state) may be referred to as the dark state. Therefore, an image may be formed by the combination of light state and dark state pixels.

Light that leaves panel module 710 travels back through the PBS 706 and to the post polarizer 717. Post polarizer 717 may help to improve contrast. In some embodiments, the PBS 706 primarily transmits P-state light towards projection lens module 708. S-state light that leaves panel module 710 may be reflected by the PBS 706 away from post-polarizer 717. However, due to limited polarization efficiency, the PBS 706 may transmit some S-state light towards projection lens module 708. Post-polarizer 717 may filter out the S-polarized light, thereby improving contrast.

Projection lens module 708 may magnify the imaged light and project the imaged light to obtain a desired full color image. Projection lens module 708 may have several lenses, which may be controlled by gears or other mechanisms to help focus the image.

Note that light engine 700 was described as having an LCoS device in the panel module 710. However, other technologies could be used in panel module 710. Another example is a digital micro mirror (DMD).

Figure 7B:
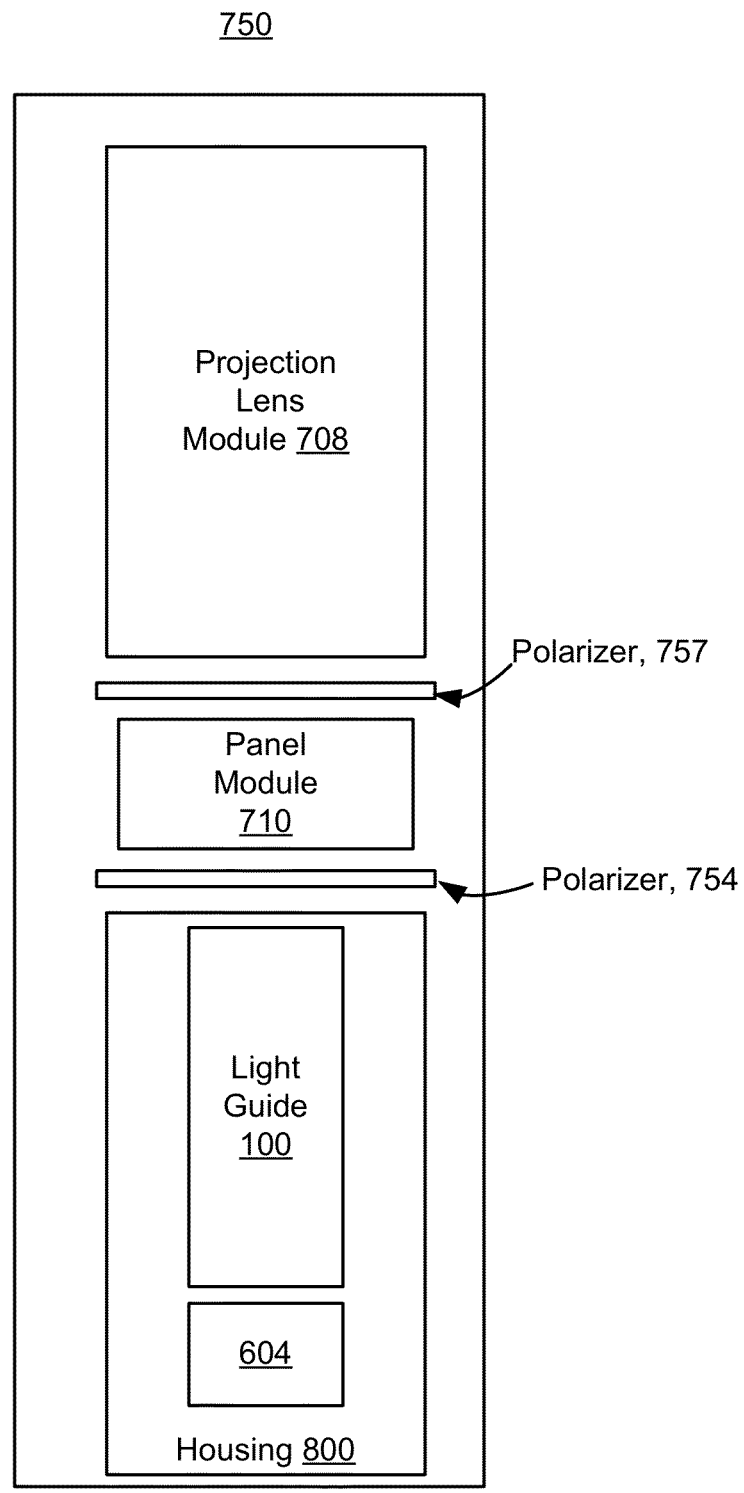
FIG. 7B depicts a block diagram of one embodiment of a light engine that uses transmissive technology in the panel module.

Also note that light engine 700 uses reflective technologies in one embodiment of panel module 710. However, transmissive technologies can also be used. In this case, the PBS 706 may not be required. An example transmissive technology is an LCD imager. FIG. 7B depicts a block diagram of one embodiment of a light engine' 750 that uses transmissive technology in panel module 710. Light engine' 750 may use various embodiments of a light guide 100 disclosed herein. Light source module 604 could include one or more different colored LEDs. Light guide 100 may provide collimated light to polarizer 754. Polarizer 754 may polarize the light in a first polarization state. For example, it may polarize the light to the S-state. The other polarizer 757 may allow light that is polarized in another orientation (e.g., P-state) to pass to projection lens module 708. Thus, light guide 100 may be used to provide collimated light for a transmissive device, such as an LCD imager.

Figure 7C:
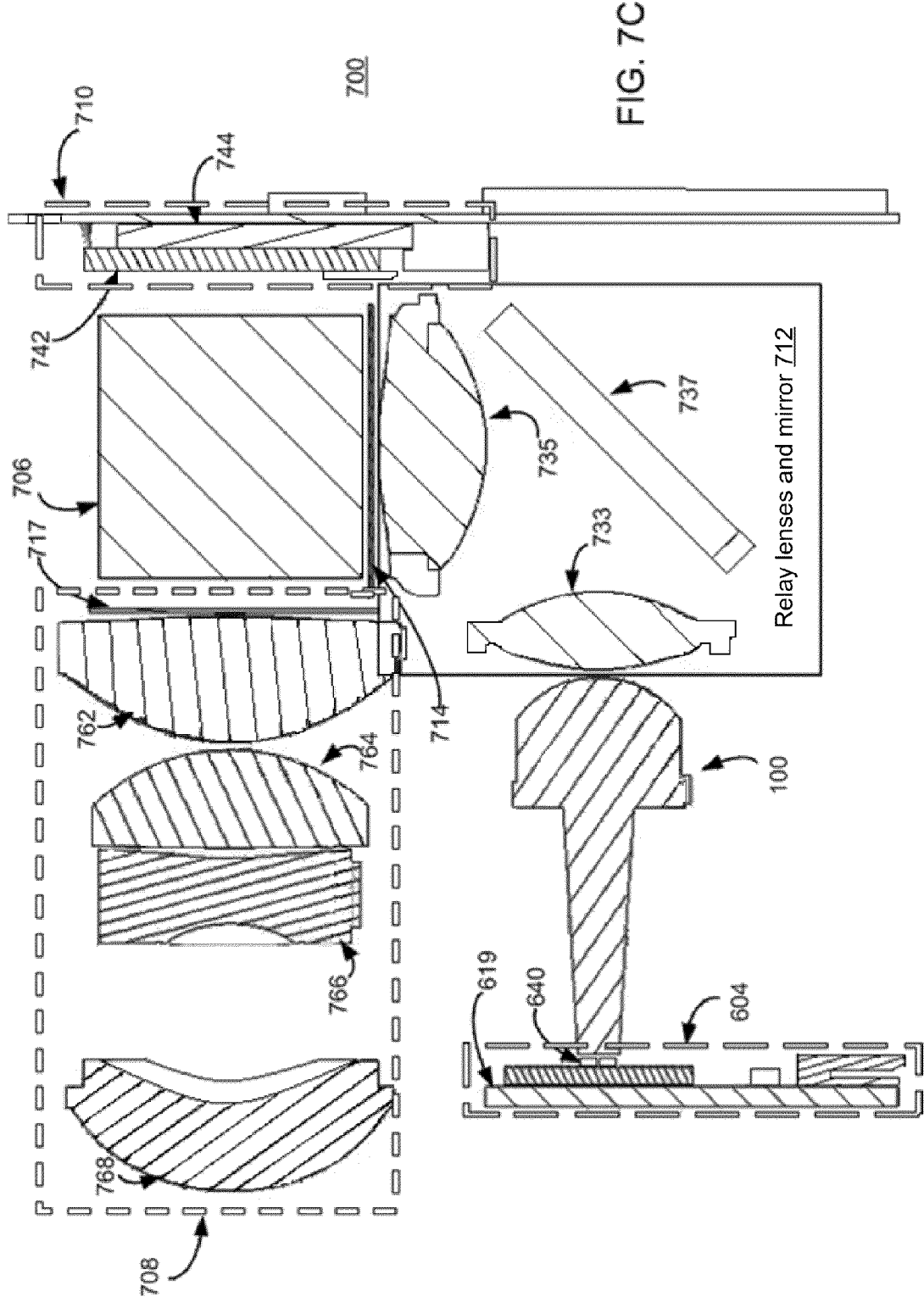
FIG. 7C depicts further details of one embodiment of a light engine in which embodiments of light guide may be used.

FIG. 7C depicts further details of one embodiment of light engine 700 in which embodiments of light guide 100 may be used. FIG. 7C depicts further details of one embodiment of light engine 700 of FIG. 7A. Light source module 604 includes a light source 640 and PC board 619, in this embodiment. The light source 640 includes four LEDs, in one embodiment. The light source 640 could include more or fewer LEDs. The light source 640 could be a different type of light source, such as laser light. The relay lenses and mirrors 712 include relay lens 733, mirror 737, and relay lens 735, in this embodiment. The panel module 710 includes a LCoS element 742 on a board 744, in this embodiment. The projection lens module 708 includes lenses 762, 764, 766, and 768, in this embodiment. The post polarizer 717 is also depicted as part of the projection lens module 708, although it could be considered to be outside of the projection lens module 708.

Figure 8A:
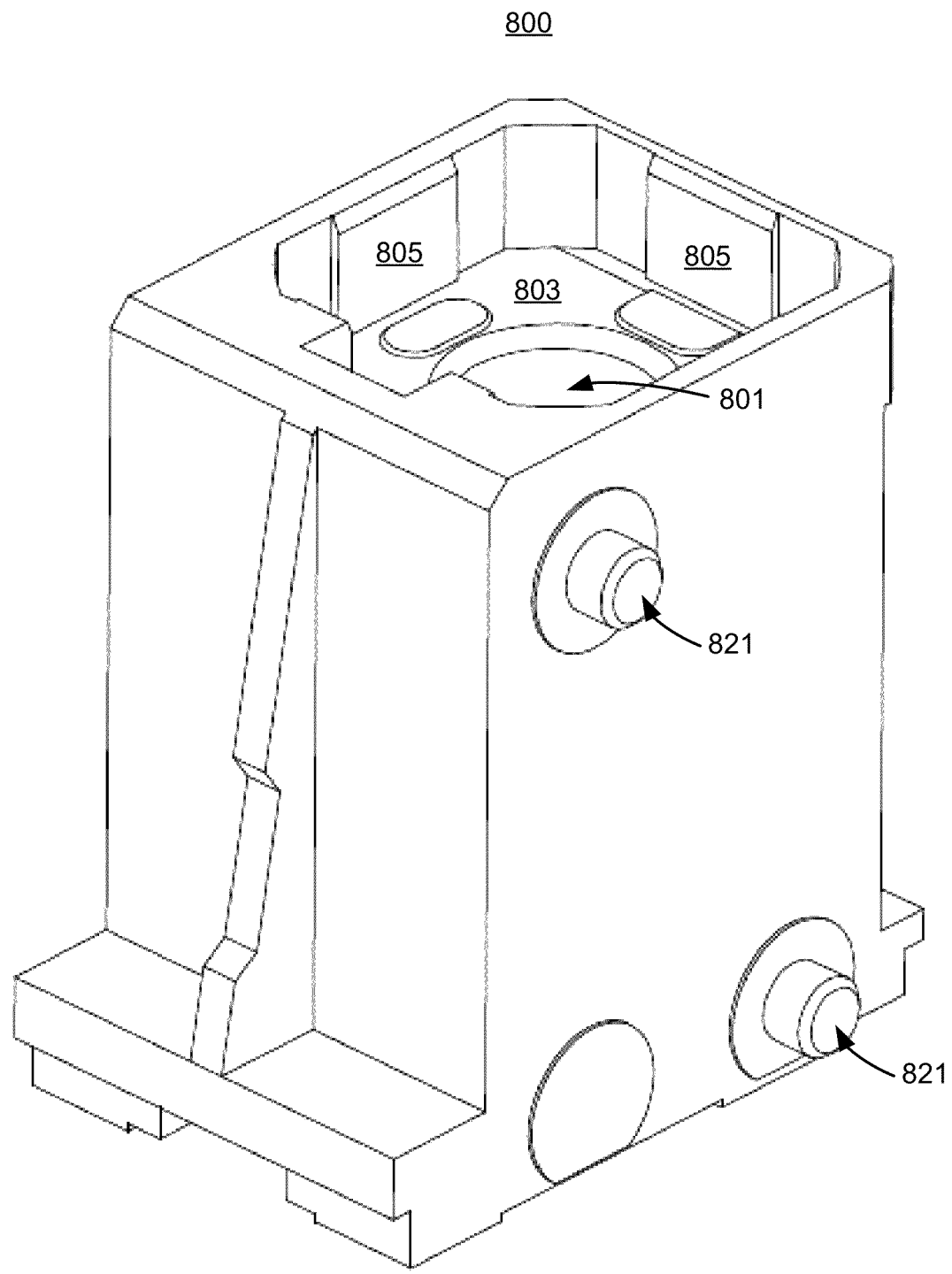
FIG. 8A depicts a perspective view of one embodiment of a housing.
Figure 8B:
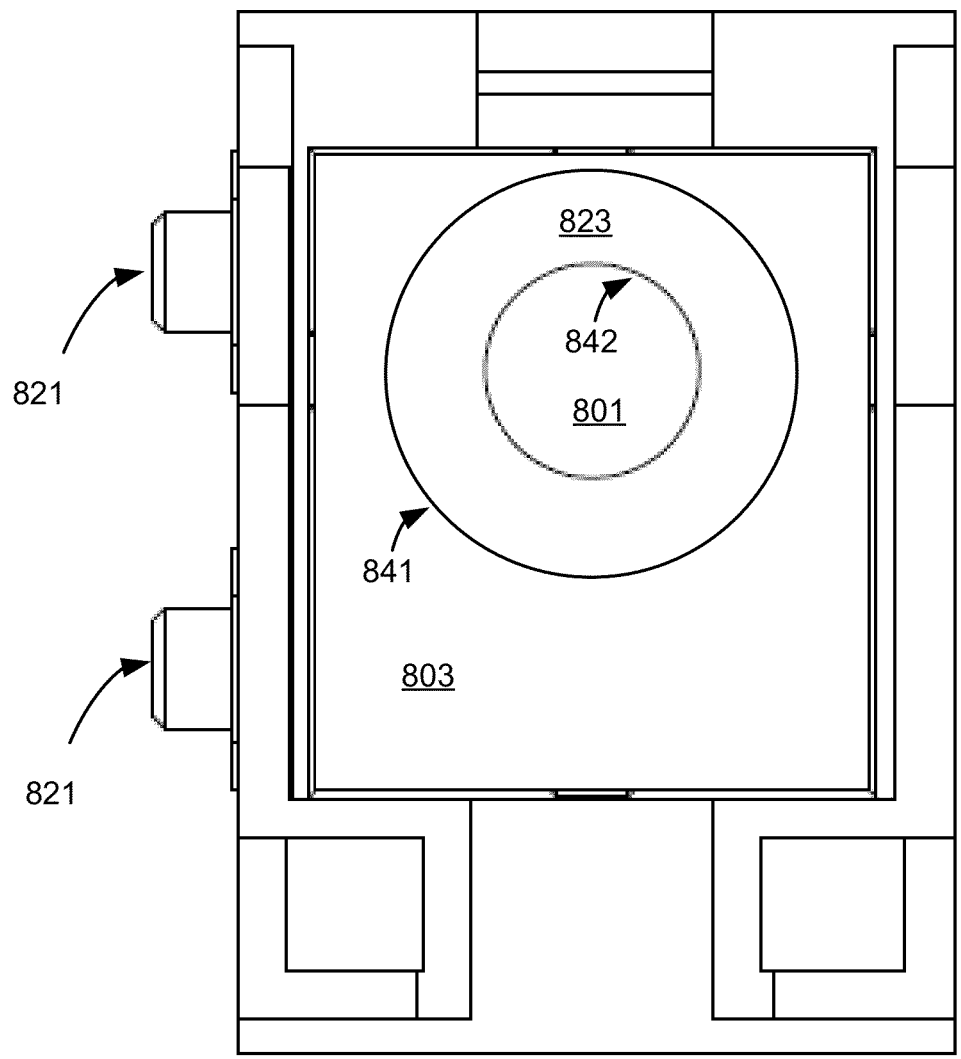
FIG. 8B depicts a top plan view of one embodiment of a housing.
Figure 8C:
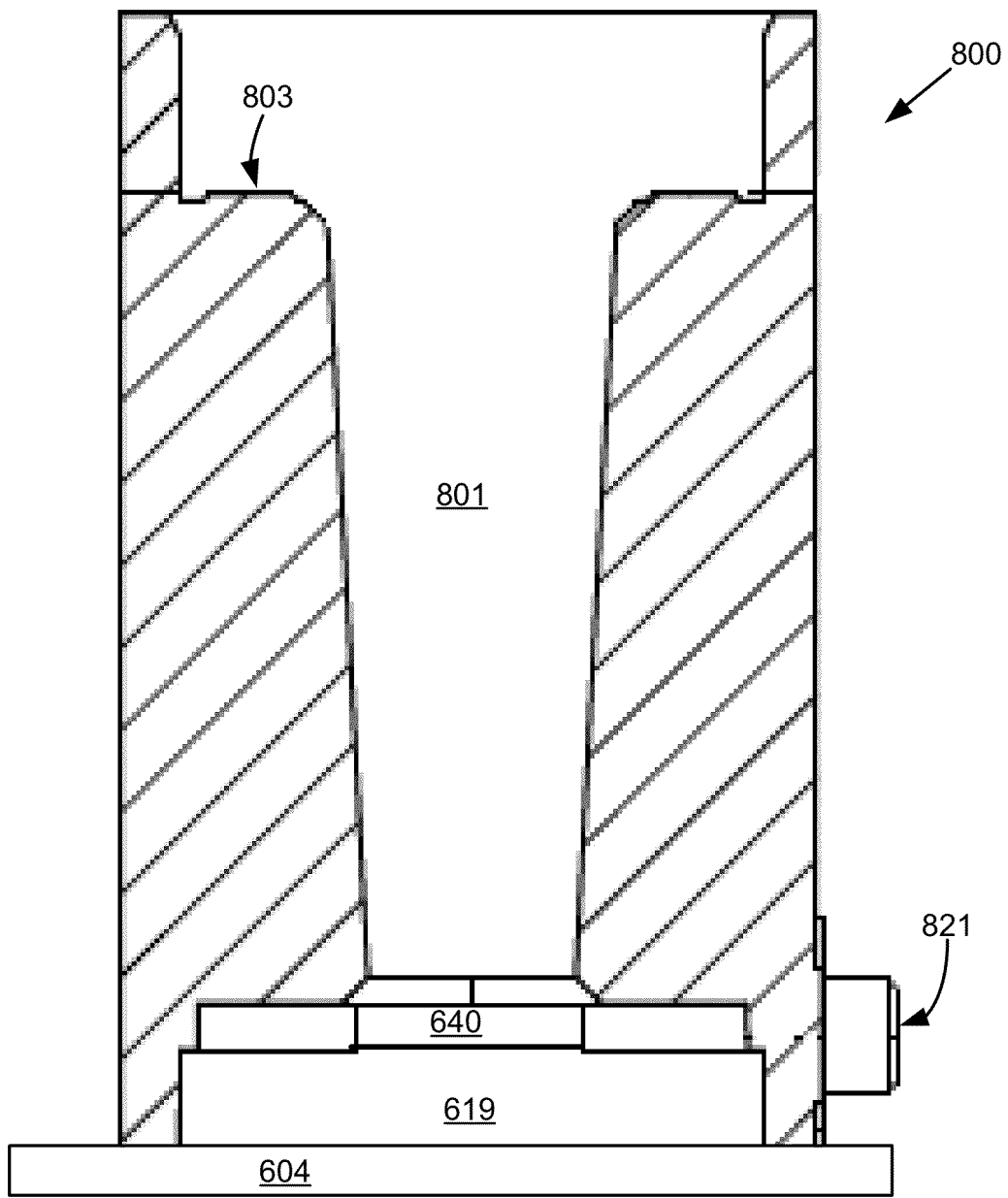
FIG. 8C depicts a cross sectional view of one embodiment of a housing and LED module.

As noted, there may be a housing 800 around light guide 100 in some embodiments. FIG. 8A depicts a perspective view of one embodiment of a housing 800. FIG. 8B depicts a top plan view of one embodiment of housing 800. FIG. 8C depicts a cross sectional view of one embodiment of housing 800. The following discussion will refer collectively to FIGS. 8A-8C. Housing 800 may have an opening 801 into which light rod 102 may fit. FIG. 8A shows the top portion of the opening 801 is surrounded by a platform 803. The platform 803 may support light guide 100. The opening 801 has a conical shape in some embodiments. FIG. 8C shows a cross section to depict the conical shape of one embodiment of the opening 801. FIG. 8B shows the opening from a top plan view. Surface 823 is the inside surface of the opening 801. Edge 841 is the edge between the opening 801 and the platform 803 of the housing. Edge 842 is the edge at the bottom of the conical opening 801.

The shape of the opening 801 may be designed based on the shape of light rod 102. For example, referring back to FIG. 2, light rod 102 may be tapered. One embodiment of a tapered light rod embodiment may thus be inserted into one embodiment of conical opening 801. Moreover, a tapered light rod may be physically supported by the housing 800. This will be discussed in more detail below.

As noted, housing 800 may have a platform 803 for supporting, or otherwise contacting, lower surface 116 of region 106 of light guide 100. Referring to FIG. 8A, housing 800 may have surfaces 805 for supporting, or otherwise contacting, side surfaces 136 of region 108 of light guide 100. Note that it is not required that surfaces 805 maintain physical contact with the light guide 100.

Housing 800 may have alignment pins 821, which can be used to align the housing 800 into a light engine (e.g., 700, 750), or other optical device. For example, the light engine may have holes that accept alignment pins 821. Therefore, light guide 100 may be precisely aligned to optical elements in a light engine. Moreover, light guide 100 may be secured in place in the light engine, such that it is not misaligned do to shocks, vibrations, etc.

Note that housing 800 may help to properly align the light guide 100 to light source 640 (e.g., LEDs). Referring to FIG. 8C, light source 640 can be seen at the bottom of opening 801. Light source 640 may sit on a PC board (or the like) 619 on light source module 604. The housing 800 may be adapted to fit precisely to a light source module 604 to facilitate alignment. As noted, light sources other than LED may be used.

Figure 8D:
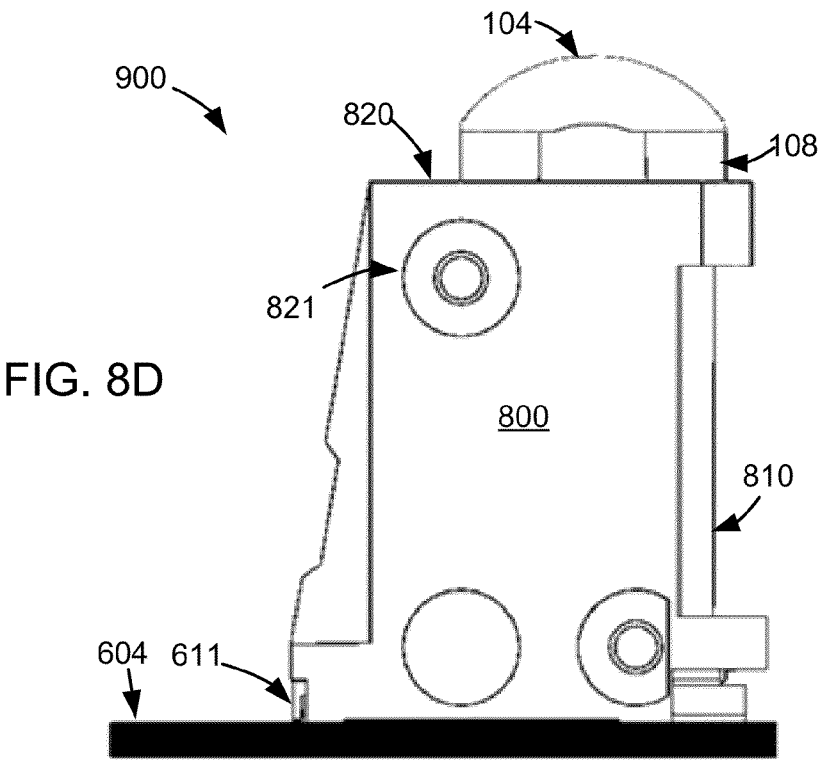
FIG. 8D depicts a side plan view of one embodiment of housing with a light guide inside.

FIG. 8D depicts a side plan view of one embodiment of housing 800 with light guide 100 inside. Housing 800 has an exterior piece 820 and an interior piece 810, in this embodiment. Briefly, interior piece 810 may have opening 801 that supports light rod 102. Exterior piece 820 may help to secure light guide 100 into housing 800. These two pieces (interior piece) 810, (exterior piece) 820 will be discussed in more detail below. As can be seen in FIG. 8D, region 108 and lens 104 of light guide 100 extend above housing 800. Housing 800 is depicted as attached to light source module 604. Together, the housing 800, light guide 100, and light source module 604 may be referred to as a light source housing assembly 900.

Figure 8F:
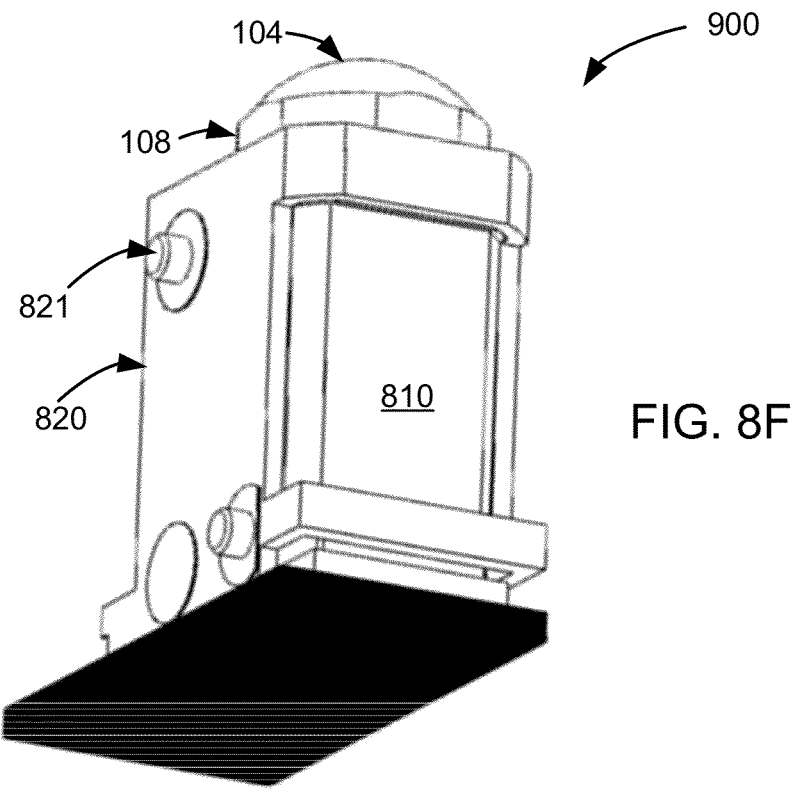
FIG. 8F depicts a perspective view of one embodiment of a two-piece housing.
Figure 8E:
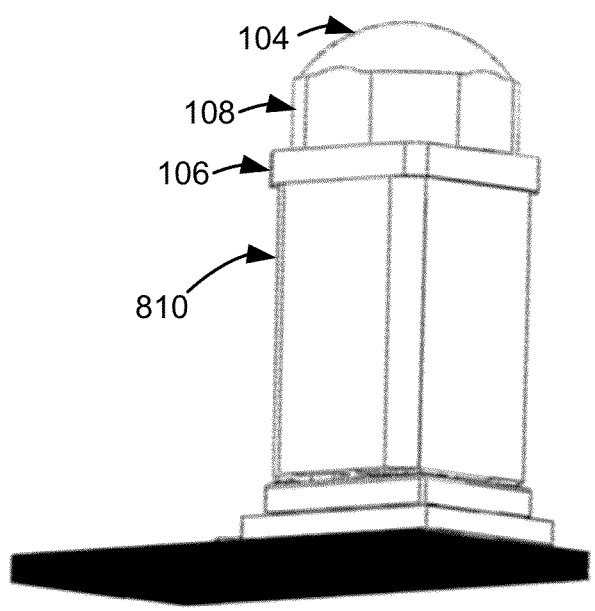
FIG. 8E depicts an interior piece of housing surrounding a light guide.

FIG. 8E depicts an interior piece 810 of housing 800 surrounding light guide 100. Region 106 of light guide 100 has its lower surface 116 (lower surface 116 not depicted in FIG. 8E) in contact with platform 803 of interior piece 810 (platform 803 not depicted in FIG. 8E). Referring back to FIG. 1, lower surface 116 of region 106 may be seen. Referring back to FIGS. 8A and 8B, lower surface 116 may rest on platform 803.

FIG. 8F depicts a perspective view of one embodiment of a two-piece housing 800. FIG. 8F shows both interior piece 810 and exterior piece 820. The interior piece 810 may be the same as the one depicted in FIG. 8E. As will be discussed below, the exterior piece 820 may help to secure light guide 100 in housing 800.

FIGS. 9A-9C depict one embodiment of interior piece 810 of housing 800. This may be similar to the interior piece 810 depicted in FIG. 8E. As noted, interior piece 810 may have an opening 801 that surrounds and supports one embodiment of light guide 100. FIG. 9A depicts a side plan view. FIG. 9B depicts a cross section at line B-B of FIG. 9A. FIG. 9C depicts a cross section at line C-C of FIG. 9A.

Referring to FIGS. 9B and 9C, a cross section of light rod 102 may be seen in opening 801. Because light rod 102 tapers in one embodiment, it has a larger cross section in FIG. 9C than 9B. Interior piece 810 may physically contact light rod 102. In one embodiment, interior piece 810 physically contacts edges of light rod 102, but does not physically contact sides of light rod 102. Interior piece 810 may physically contact light rod 102 from substantially light entrance 110 to light exit 112. However, note that is it not required that physical contact be maintained all of the way from light entrance 110 to light exit 112. For example, referring to FIG. 9A, a portion of light rod 102 near light entrance 110 might not be in physical contact with interior piece 810.

Further note that interior piece 810 may itself include an inner portion 813 and an outer portion 817. Inner portion 813 may be conical in shape and may support light rod 102. Outer portion 817 may surround inner portion 813. Referring to FIG. 9B, these two portions 813, 817 may be physically joined by four small segments. More or fewer segments could be used. Referring to FIG. 9C, inner portion 813 may be larger near the top such that part of it may merge with outer portion 817. In one embodiment, inner portion 813 is black, which may absorb stray light from light rod 102.

Note that interior piece 810 of housing 800 may physically support light rod 102 during use. One benefit of this is that housing 800 may prevent light rod 102 from deforming, bending, mis-aligning, etc. during use. Note that light guide 100 may be used in a device that is very small. Also note that the device could be mobile. For example, light guide 100 might be used in a projector (or other optical device) in a cellular telephone or other portable electronic device. It is possible that the device could be dropped. Housing 800 may keep light rod 102 properly aligned in such an event.

For some devices (e.g., cellular telephones) and some safety regulations, the resonant frequency should be more than 2 kHz. Some embodiments of the light guide 100 could be used inside such devices. By physically supporting the light rod 102, housing 800 may prevent deformations of light rod 102 during use. The light rod 102 and/or housing 800 of some embodiments may also contribute to a wide range of resonant frequencies greater than 2 kHz.

Figure 10:
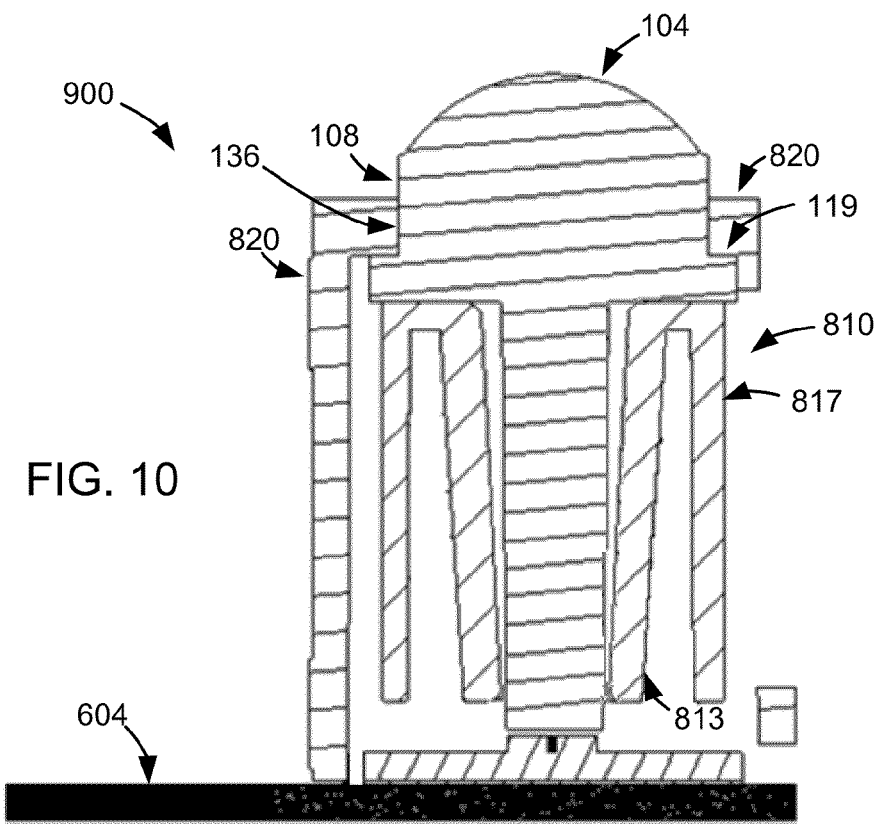
FIG. 10 depicts a cross section of one embodiment of housing and light guide.

FIG. 10 depicts a cross section of one embodiment of housing 800 and light guide 100. In this embodiment, housing 800 includes two pieces. FIG. 10 shows the same view as FIG. 8D. FIG. 10 depicts interior section 810 surrounding the light rod 102. Note that from this view, interior section 810 does not make physical contact with light rod 102 along the sidewalls of light rod 102. Referring back to FIGS. 9B and 9C this can be understood by noting that interior section 810 might only physically contact the light rod 102 at the four edges of the light rod 102. Note that the cross section in FIG. 10 does not show the edges of the light rod 102.

As noted herein, interior section 810 may itself include two joined pieces. FIG. 10 shows an inner portion 813 in the middle, which may be joined to a flat exterior portion 817. Having the inner portion 813 in the middle may provide for some amount of flexibility when light rod 102 is inserted. For example, when light rod 102 is inserted in opening 801, the inner portion 813 may expand somewhat. This may allow for good physical contact while relaxing tolerances of part sizes. However, in some embodiments, the interior section 810 does not have to portions 813 and 817. Instead, interior section may include a single portion.

Note that in FIG. 10, lower surface 116 of the region 106 is on platform 803 of interior section 810. Further note that exterior piece 820 of housing 800 secures light guide 100. Exterior piece 820 may be in physical contact with one or more top surfaces 119 of region 106. Exterior piece 820 may be in physical contact with the one or more side surfaces 136 of region 108.

As noted, housing 800 includes two separate pieces, in this embodiment. This may allow easy assembly of housing 800 around light guide 100. For example, first the light guide 100 may be placed into opening 801 of interior section 810 (without exterior piece 820 in place). Then, exterior piece 820 can be configured into place over top surface 119 of region 106 and adjacent to one or more side surfaces 136 of region 108 to secure light guide 100 into place.

Note that when the light guide 100 is in the housing 800 that one or more sidewalls of the light guide 100 may be in physical contact with housing 800. For example, some portion of side surfaces 136 of region 108 may contact the housing 800. It is also possible for lower surface 116 of region 106 to contact housing 800. Some portion of side surfaces 116 of region 106 may also contact housing 800. Even though some embodiments of light guide 100 operate by total internal reflection, there is little or no light lost as a result of this contact. This is because the sidewalls that may contact the housing 800 may be away from the optical path between the light exit 112 and lens 104.

Figures 11, 12:
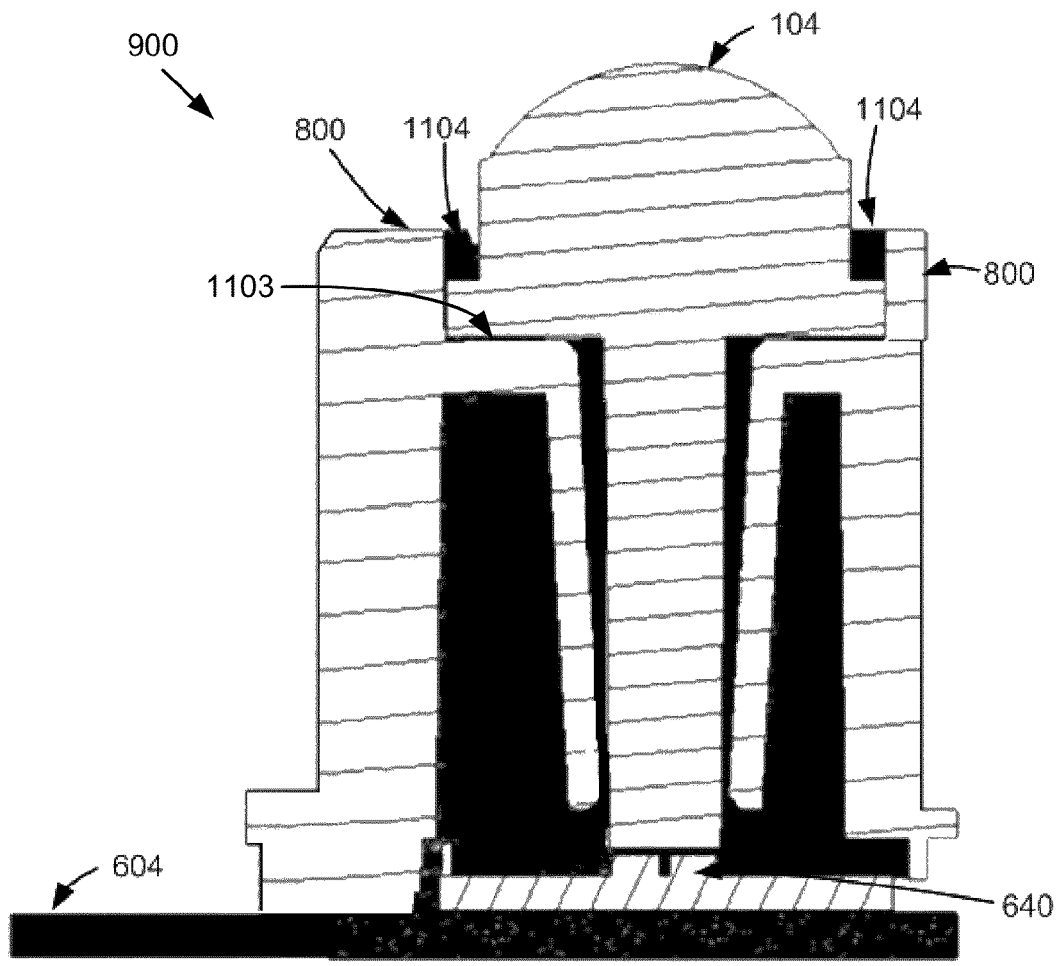
FIG. 11 depicts a cross section of one embodiment of housing and light guide.
FIG. 12 depicts a flowchart of one embodiment of a process of manufacturing a single piece light guide.

FIG. 11 depicts a cross section of one embodiment of housing 800 and light guide 100. In this embodiment, housing 800 includes a single piece. The lower surface 116 of region 106 physically contacts a surface 1103 of the housing 800. Surface 1103 may be similar to platform 803 of one embodiment in which housing has two pieces. Surface 1103 cannot be seen in FIG. 11, but the edge of surface 1103 is pointed to.

Side surfaces 126 (not depicted in FIG. 11) of region 106 may physically contact housing 800, in the embodiment of FIG. 11. Therefore, light guide 100 can easily and accurately be placed into housing 800, such that light rod 102 is in the opening 801. Housing 800 of a one piece embodiment will therefore physically support light rod 102. Note that opening 801 of embodiments of a one piece housing may have a conical opening, which may support a tapered light rod.

One or more elements 1104 may be used to help secure light guide 100 into the housing 800. Element(s) 1104 may be affixed to housing 800 to hold the light guide 100 into the housing. For example, element 1104 may be physically attached to a sidewall of housing 800. Optionally, element 1104 could be affixed to a portion of the light guide 100, but this is not required. In some embodiments, element 1104 is in physical contact with one or more surfaces of light guide 100 to secure light guide 100 into place. Element 1104 may be in physical contact with top surface 119 (not depicted in FIG. 11) of region 106 and/or side surfaces 136 (not depicted in FIG. 11) of region 108.

Also note that housing 800 of a one piece embodiment may be attached to light source module 604. Therefore, light rod 102 may be precisely aligned to light source 640.

FIG. 12 depicts a flowchart of one embodiment of a process 1200 of manufacturing a single piece light guide 100. The process 1200 may be used to form various embodiments of single piece light guides 100 disclosed herein.

Step 1202 includes forming a single piece light guide that has a light rod 102 and lens 104. The light guide 100 may optionally have one or more of regions (e.g., regions 106 and/or 108) between the light rod 102 and lens 104.

In some embodiments, the single piece light guide 100 is formed using an injection molding process. This may include using a mold that is configured to form a single piece light guide. Light guide 100 may be formed from an optical grade material. Examples of optical grade materials include, but are not limited to, acrylic resins, polycarbonates, epoxies, and glass. In some embodiments, the entire light guide 100 is formed from the same material. However, in some embodiments, light guide 100 is formed from two or more different materials. In one embodiment, light rod 102 is solid. For example, light rod 102 may be a solid integrating optic. In one embodiment, light rod 102 is hollow.

Figure 13:
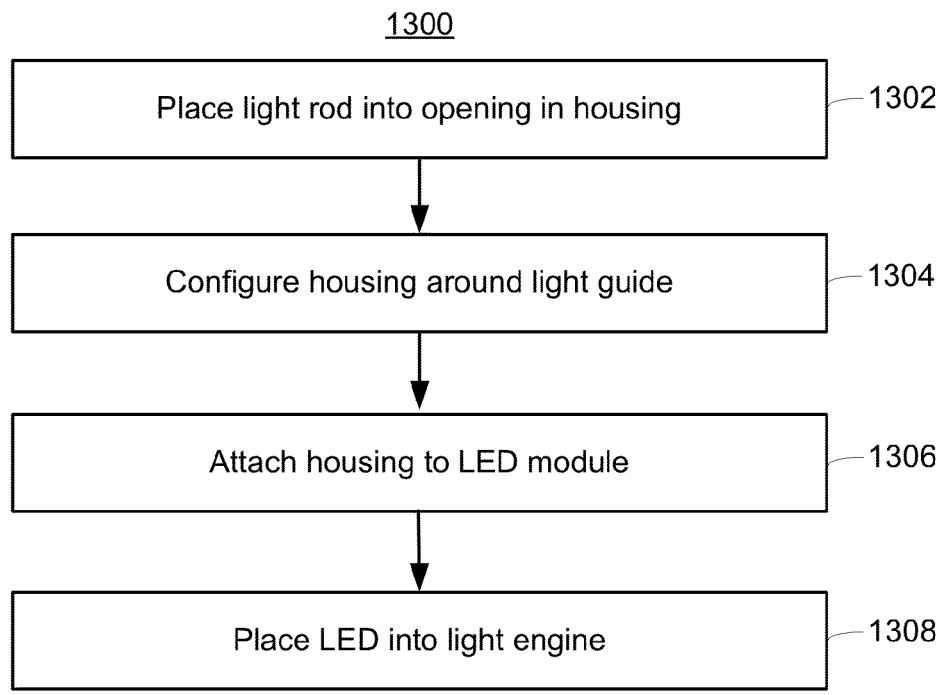
FIG. 13 depicts a flowchart of one embodiment of a process of configuring a light source housing assembly into a light engine.

FIG. 13 depicts a flowchart of one embodiment of a process 1300 of configuring a light source housing assembly 900 into a light engine. Process 1300 may be used to assemble various embodiments of light source housing assemblies 900 disclosed herein. Process 1300 may be used with either a one piece housing or a two piece housing.

In step 1302, light rod 102 of light guide 100 is placed into opening 801 of housing 800. The opening 801 may be conical, and the light rod 102 may be tapered. Edges of the light rod 102 may physically contact the housing 800, as depicted in FIGS. 9B, 9C, such that the conical portion supports light rod 102. In one embodiment, element 107 is used to properly align the light rod 102 into the housing 800, such that light exit 112 is properly positioned. For example, the light exit 112 may have a rectangular shape. Element 107 may be used to properly orient the rectangular shape such that light is projected with the desired aspect ratio.

Figure 13A:
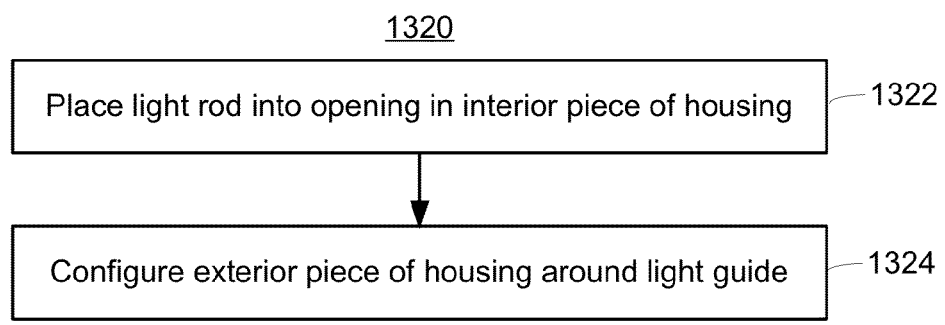
FIG. 13A depicts a flowchart of one embodiment of a process of configuring a light source housing assembly.
Figure 13B:
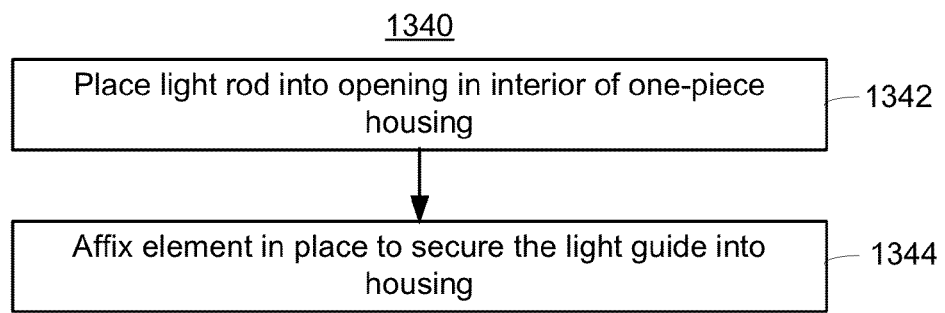
FIG. 13B depicts a flowchart of one embodiment of a process of configuring a light source housing assembly.

Also, a lower surface 116 of the region 106 may physically contact one or more platforms or surfaces 803 of housing 800. FIG. 10 depicts a cross-section showing how the lower surface 116 of the region 106 may contact the housing (note that as of step 1302 the exterior piece 820 will not yet be in place). FIG. 11 depicts another example of how the lower surface 116 of the region 106 may contact the housing. However, note that element 1104 is not yet in place, as of step 1302. FIGS. 13A and 13B provide further details of embodiments of step 1302.

In step 1304, housing 800 is configuring around light guide 100. Step 1304 may result in light guide 100 being held or secured in housing 800. In one embodiment, light guide 100 has a ridge between light rod 102 and lens 104. In step 1304, the housing may be configured around the ridge. FIGS. 13A and 13B provide further details of embodiments of step 1304.

In step 1306, housing 800 is attached to light source module 604. FIG. 8D depicts housing assembly 900 attached to light source module 604. Note that instead of an LED module, a different type of light source could be used.

In step 1308, light source housing assembly 900 is placed into a light engine (e.g., 700, 750). In some embodiments, housing 800 has alignment pins 821 to assist. The light engine may have a casing with small holes located strategically to accept the alignment pins 821.

FIG. 13A depicts a flowchart of one embodiment of a process 1320 of configuring a light source housing assembly 900. Process 1320 may be used to implement steps 1302-1304 of process 1300. Process 1320 may be used with one embodiment of a two piece housing 800.

In step 1322, light rod 102 may be placed into opening 801 in interior piece 810 of housing 800. In step 1322, lower surface 116 of region 106 may be placed onto platform 803. Step 1322 is one embodiment of step 1302.

In step 1324, exterior piece 820 of housing 800 is configured around light guide 100. In one embodiment, after exterior piece 820 is placed around interior piece 810, the two pieces are mated together. For example, the two pieces may be designed to "snap" together such that exterior piece 820 stays in place. Alternatively, an adhesive (e.g., epoxy) may be used to hold exterior piece 820 to interior piece 810. Step 1324 may result in the light guide 100 being held securely in the housing 800. FIG. 10 depicts one embodiment in which the exterior piece 820 is in place around the light guide 100. Step 1324 is one embodiment of step 1304.

FIG. 13B depicts a flowchart of one embodiment of a process 1340 of configuring a light source housing assembly 900. Process 1340 may be used to implement steps 1302-1304 of process 1300. Process 1340 may be used with one embodiment of a one piece housing 800.

In step 1342, light rod 102 is placed into opening 801 in housing 800. Step 1342 is one embodiment of step 1302. Referring to FIG. 11, light rod 102 may be placed into the opening 801 such that lower surface 116 of region 106 contacts surface 1103 of housing 800. Note that elements 1104 are not yet in place.

In step 1344, an element 1104 is affixed in place to secure the light guide 100 into housing 800. Referring to FIG. 11, one or more elements 1104 may be affixed to the housing 800 to hold the light guide 100 into the housing. For example, element 1104 may be physically attached to a sidewall of housing 800. Optionally, element 1104 could be affixed to a portion of light guide 100, but this is not required. In some embodiments, element 1104 is in physical contact with one or more surfaces of light guide 100 to secure light guide 100 into place. Element 1104 may be in physical contact with top surface 119 of region 106 and/or side surfaces 136 of region 108. Step 1344 is one embodiment of step 1304.

One embodiment disclosed herein includes a single piece light guide. The single piece light guide may include a light rod and a lens. The light rod has a first end, a second end, and may have at least one side between the first and second ends. The first end is for receiving light, and the second end serves as a light exit. The lens is optically coupled to the light exit. The light rod may be an integrating optic, and may be solid. The single piece light guide may also have one or more regions between the light rod and the lens. The one or more regions have an outer surface that extends beyond the light exit. At least a portion of the outer surface of the region may be substantially planar.

One embodiment includes a method for fabricating a single piece light guide. The method may include forming a single piece having a light rod and a lens. The light rod has a first end and a second end. The first end is for receiving light; the second end has a light exit. The lens is optically coupled to the light exit of the light rod. The single piece light source may be formed using an injection molding process. The single piece light source may also include a region between the light rod and the lens. The region has an outer surface that may extend beyond the light exit. At least a portion of the outer surface of the region may be substantially planar.

One embodiment includes a light engine, which may comprise a light source and a single piece light guide. The single piece light guide may have a light rod and a lens. The light rod may have a first end, a second end, and at least one side between the first and second ends. The first end receives light from the light source; and the second end has a light exit. The lens is optically coupled to the light exit of the light rod. The light engine may further include a housing around the light guide. The housing may physically contact at least a portion of the light rod from substantially the first end to the second end of the light rod.

One embodiment includes a single piece light guide comprising first means for capturing and transmitting light from a light source, and second means for collimating light from the first means. The first and second means are formed as one piece.

One embodiment includes an assembly comprising a light guide and a housing. The light guide has a light rod having a first end for receiving light, and a second end having a light exit. The light rod tapers from the second end to the first end. The light guide also has a lens that is optically coupled to the light exit of the light rod. The assembly also has a housing having a conical portion that supports the light rod. The light guide may include a first region and a second region between the light rod and the lens. The first region may include a ridge that extends beyond the second region and the light exit. The housing may be configured to hold the light guide in place by securing the ridge.

One embodiment includes a method for assembling a light source housing assembly. The method comprising accessing a light guide that includes a light rod and a lens. The light rod having a first end and a second end, with the first end for receiving light. The light rod has a light exit at the second end. The light rod tapers from the second end to the first end. The light rod has a lens that is optically coupled to the light exit of the light rod. The method includes placing the light guide into a housing having a conical portion such that the conical portion supports the light rod. The method may further include configuring the housing around a ridge of the light guide.

One embodiment includes a light engine comprising a light source, a light guide and a housing. The light guide has a light rod having a first end and a second end. The first end receives light from the light source. The light rod has a light exit at the second end. The light rod tapers from the second end to the first end. The light rod has a lens that is optically coupled to the light exit of the light rod. The housing had a conical interior that supports the light rod.

One embodiment includes a light guide that includes a light rod, a lens, and one or more regions between the light rod and the lens. The light rod has a first end and a second end. The first end is for receiving light. The light rod has a light exit at the second end. The lens is optically coupled to the light exit of the light rod. The one or more regions has at least one outer surface that extends beyond the light exit. In one embodiment, a cross section of at least a portion of the one or more regions in a first direction perpendicular to the first end to the second end of the light rod is shaped differently than a cross section of the lens in the first direction. In one embodiment, a portion of the outer surface is substantially planar. In one embodiment, the light rod is an integrating optic.

One embodiment includes a method for fabricating a light guide. The method may comprise forming a light rod, forming a lens, and forming a region between the light rod and the lens. The light rod may have a first end and a second end. The first end may be for receiving light. The light rod has a light exit at the second end. The lens is optically coupled to the light exit of the light rod. The region has an outer surface that extends beyond the light exit. In one embodiment, injection molding is used to form the light guide having the light rod, the lens, and the region.

One embodiment includes a light engine comprising a light source and a light guide. The light guide has an integrating optic, a lens, and one or more regions between the integrating optic and the lens. The integrating optic has a first end and a second end. The first end receives light from the light source. The integrating optic has a light exit at the second end. The lens is optically coupled to the light exit of the integrating optic. The one or more regions have at least one outer surface that extends beyond the light exit. In one embodiment, the light engine includes a panel module for creating an image, wherein the light guide provides light to the panel module to be used to create the image.

The foregoing detailed description of embodiments has been presented for purposes of illustration and description. It is not intended to be exhaustive or to limit embodiments to the precise form disclosed. Many modifications and variations are possible in light of the above teaching. The described embodiments were chosen in order to best explain the principles and practical applications, to thereby enable others skilled in the art to best utilize the various embodiments and with various modifications as are suited to the particular use contemplated. It is intended that the scope be defined by the claims appended hereto.

What is claimed is:

1. A single piece light guide, comprising:
a light rod; and
a lens formed as one piece with the light rod, the light rod having a first end and a second end, the first end for receiving light, the second end serves as a light exit, the lens is optically coupled to the light exit, the light rod and the lens are formed from a single piece of the same material.

2. The light guide of claim 1, wherein:
the light rod is a solid integrating optic.

3. The light guide of claim 1, wherein:
the light rod tapers from the second end to the first end.

4. The light guide of claim 1, wherein:
the lens is a convex lens.

5. The light guide of claim 1, wherein:
the lens is a collimating lens.

6. A single piece light guide, comprising:
a light rod; and
a lens formed as one piece with the light rod, the light rod having a first end and a second end, the first end for receiving light, the second end serves as a light exit, the lens is optically coupled to the exit; and
one or more regions between the light rod and the lens, the one or more regions has at least one outer surfaces, the at least one outer surfaces extends beyond the light exit, at least a portion of the at least one outer surfaces is substantially planar.

7. The light guide of claim 6, wherein:
the one or more one or more regions includes a first region and a second region, the first region includes a ridge that extends beyond the second region and the light exit.

8. A method for fabricating a light guide, comprising:
forming a single piece having a light rod and a lens, the light rod having a first end and a second end, the first end for receiving light, the second end has a light exit, the lens is optically coupled to the light exit of the light rod, the forming a single piece includes forming the light rod and the lens using the same injection molding process, the forming the single piece includes using the same material to form the light rod and the lens.

9. A method fabricating a light guide, comprising:
forming a single piece having a light rod and a lens, the light rod having a first end and a second end, the first end for receiving light, the second end has a light exit, the lens is optically coupled to the light exit of the light rod, wherein the forming the light guide includes:
forming a region between the light rod and the lens, the region has an outer surface, the outer surface of the region extends beyond the light exit, at least a portion of the outer surface of the region is substantially planar.

10. The method of claim 9, wherein the forming the region includes:
forming a ridge that extends beyond the second end and the light exit.

11. A light engine, comprising:
a light source;
a single piece light guide having a light rod and a lens, the light rod having a first end, a second end, and at least one surface between the first and second ends, the first end receives light from the light source, the second end has a light exit, the lens is optically coupled to the light exit of the light rod; and
a housing around the light guide. the housing physically contacts at least a portion of the light rod from substantially the first end to the second end of the light rod, but does not contact, the at least one surface.

12. The light engine of claim 11, wherein the light rod tapers from the second end to the first end, the housing has a conical portion that supports the light rod.

13. The light engine of claim 11, wherein:
the light rod has a plurality of sides connected by a plurality of edges, the sides and edges extend from the first end to the second end of the light rod, the housing physically contacts at least two of the edges but does not physically contact the sides.

14. The light engine of claim 11, wherein:
the light source includes a plurality of light sources that emit a plurality of colors, the light rod integrates the plurality of colors.

15. A light engine, comprising:
a light source; and
a single piece light guide having a light rod and a lens, the light rod having a first end, a second end, and at least one surface between the first and second ends, the first end receives light from the light source, the second end has a light exit, the lens is optically coupled to the light exit of the light rod, wherein the single-piece light guide includes:
a region between the light rod and the lens, the region has an outer surface, the outer surface of the region extends beyond the light exit, at least a portion of the outer surface of the region is substantially planar.

16. The light engine of claim 15, wherein the region has a ridge.

17. The light engine of claim 16, further comprising:
a housing around the light guide, the housing physically contacts at least a portion of the light rod from substantially the first end to the second end of the light rod, the ridge fits into the housing.

18. A single piece light guide, comprising:
first means for receiving and transmitting light from a light source; and
second means for collimating light from the first means, the first and second means formed as a single unbroken piece of the same material, the second means optically coupled to the first means.

19. The single piece light guide of claim 18, wherein:
the first means is for integrating the light from the light source.

* * * * *

UNITED STATES PATENT AND TRADEMARK OFFICE
CERTIFICATE OF CORRECTION

PATENT NO. : 8,567,997 B2  Page 1 of 1
APPLICATION NO. : 13/226255
DATED : October 29, 2013
INVENTOR(S) : C. Hsiung et al.

It is certified that error appears in the above-identified patent and that said Letters Patent is hereby corrected as shown below:

In the claims of the printed patent, column 16, line 9 (claim 11, line 9), please change "guide." to --guide,--.

Signed and Sealed this
Twentieth Day of May, 2014

Michelle K. Lee
*Deputy Director of the United States Patent and Trademark Office*